US012433536B1

(12) United States Patent
Peterson et al.

(10) Patent No.: US 12,433,536 B1
(45) Date of Patent: Oct. 7, 2025

(54) MECHANICALLY SEALED HOUSINGS FOR PHYSIOLOGICAL MONITORS

(71) Applicant: Whoop, Inc., Boston, MA (US)

(72) Inventors: Benjamin August Rothenberg Peterson, Cambridge, MA (US); Aurelian Nicolae, Providence, RI (US)

(73) Assignee: Whoop, Inc., Boston, MA (US)

( * ) Notice: Subject to any disclaimer, the term of this patent is extended or adjusted under 35 U.S.C. 154(b) by 0 days.

(21) Appl. No.: 18/609,872

(22) Filed: Mar. 19, 2024

(51) Int. Cl.
*A61B 5/05* (2021.01)
*A61B 5/00* (2006.01)
*A61B 50/30* (2016.01)

(52) U.S. Cl.
CPC ...... *A61B 5/681* (2013.01); *A61B 2050/3014* (2016.02); *A61B 2562/18* (2013.01)

(58) Field of Classification Search
CPC ......... A61B 5/282; A61B 5/0006; A61B 5/25; A61B 5/6833; A61B 2560/0412; A61B 2562/0215; A61B 5/6831; A61B 5/02438; A61B 5/681; A61B 5/02055; A61B 5/332; A61B 5/0245; A61B 5/1118; A61B 2560/0468; A61B 5/30; A61B 5/389; A61B 5/0537; A61B 5/6824; A61B 5/6823; A61B 5/6804; A61B 2562/227; A61B 5/308; A61B 5/6802; A61B 5/6805; A61N 1/0492; A61N 1/0476; A61N 1/0472; A61N 1/04; A61N 1/0436
USPC .......................... 600/372, 382–393, 508–509
See application file for complete search history.

(56) References Cited

U.S. PATENT DOCUMENTS

| 4,777,954 A * | 10/1988 | Keusch ..................... A61B 5/25 600/397 |
| 6,636,754 B1 * | 10/2003 | Baura ................. A61B 5/02028 600/382 |
| 11,116,448 B1 | 9/2021 | Trapero Martin et al. |
| 2003/0220553 A1 * | 11/2003 | Axelgaard ............. A61B 5/259 600/391 |
| 2008/0288026 A1 * | 11/2008 | Cross ................. H01R 13/5224 607/60 |

(Continued)

FOREIGN PATENT DOCUMENTS

CN         110244546         9/2019

OTHER PUBLICATIONS

ISA/EP, "PCT Application No. PCT/US24/20567 International Search Report and Written Opinion mailed Oct. 14, 2024", 15 pages.

*Primary Examiner* — Joseph A Stoklosa
*Assistant Examiner* — Brian M Antiskay
(74) *Attorney, Agent, or Firm* — Strategic Patents, P.C.

(57) ABSTRACT

An enclosure for an electronic device, such as a wearable physiological monitor, may be formed of at least two different materials, e.g., a first part formed of a first material (e.g., a metal) and a second part formed of a second material (e.g., a plastic). The second part may include an opening to receive at least a portion of the first part therein, where the first part includes an anchor projecting from a surface thereof into the opening of the second part. To ensure that the enclosure is waterproof, a third part that can be chemically bonded to the second part may secure the first part by filling a volume between the anchor of the first part and an adjacent surface of the second part around the opening. In some aspects, the chemical bond between the second part and the third part creates an environmental seal around the opening.

20 Claims, 15 Drawing Sheets

(56) References Cited

U.S. PATENT DOCUMENTS

| | | | |
|---|---|---|---|
| 2014/0152890 A1* | 6/2014 | Rayner | H04N 23/51 |
| | | | 277/312 |
| 2016/0045721 A1* | 2/2016 | Bachinski | A61N 1/048 |
| | | | 607/149 |
| 2016/0066859 A1* | 3/2016 | Crawford | A61B 5/681 |
| | | | 600/595 |
| 2017/0000415 A1 | 1/2017 | Lapetina et al. | |
| 2021/0193977 A1* | 6/2021 | Reykhert | H05K 1/141 |
| 2021/0259634 A1 | 8/2021 | Ginestet et al. | |
| 2022/0039720 A1* | 2/2022 | Abercrombie, II | A61B 5/257 |

* cited by examiner

MECHANICALLY SEALED HOUSINGS FOR PHYSIOLOGICAL MONITORS

TECHNICAL FIELD

The present disclosure generally relates to devices, assemblies, systems, and methods for mechanically securing a housing of a wearable physiological monitor or similar electronic devices, e.g., for forming a waterproof enclosure for one or more electronic components thereof.

BACKGROUND

Electronic devices such as wearable physiological monitors may be substantially waterproof to ensure the safety, durability, reliability, hygiene, and/or versatility of such devices, making them suitable for use in various conditions and activities. For example, if a wearable physiological monitor is intended to be continuously wearable—where a wearer need not remove the device for charging or otherwise—the device should be sufficiently waterproof such that activities such as bathing, swimming, exercising, cleaning, wearing while in damp or wet environmental conditions, and the like will not damage sensitive electronic components included within an enclosure of the device, and so the device continues to function accurately and reliably during such activities or in different environments. However, creating a waterproof enclosure for a wearable physiological monitor or similar electronic device may be challenging, particularly when different materials are used for the assembly of such devices. For example, in electronic devices that include enclosures formed of different materials such as metal and plastic, insert molding the plastic about the metal may not create a sufficient seal for waterproofing, and gluing or taping these material can lead to gaps therebetween and/or other undesirable effects. Furthermore, when materials have different coefficients of thermal expansion, this can cause separation of these materials over the lifetime of a device.

There remains a need for improved waterproof multi-part housing assemblies for wearable physiological monitors or other electronic devices and the like.

SUMMARY

An enclosure for an electronic device, such as a wearable physiological monitor, may be formed of at least two different materials, e.g., a first part formed of a first material (e.g., a metal) and a second part formed of a second material (e.g., a plastic). The second part may include an opening to receive at least a portion of the first part therein, where the first part includes an anchor projecting from a surface thereof into the opening of the second part. To ensure that the enclosure is waterproof, a third part that can be chemically bonded to the second part may secure the first part by filling a volume between the anchor of the first part and an adjacent surface of the second part around the opening. In some aspects, the chemical bond between the second part and the third part creates an environmental seal around the opening.

In an aspect, a waterproof wearable physiological monitoring device disclosed herein may include: a first part including a plurality of pads, each pad of the plurality of pads formed of a first material having a first melt temperature, and a plurality of plates, each affixed to a first surface of one of the plurality of pads, each of the plurality of plates including at least one anchor formed along a perimeter of one of the plurality of plates and projecting from the perimeter at a first angle such that the at least one anchor is disposed above the first surface of its respective pad; a second part including a first support structure formed substantially of a second material having a second melt temperature that is lower than the first melt temperature, the first support structure including one or more openings for each of the plurality of pads such that a second surface of each pad that opposes the first surface is exposed along an exterior surface of the device and the first surface of each pad is contained within an interior of the device; and a third part, where the third part includes a second support structure formed substantially of a third material having a third melt temperature that is lower than the first melt temperature, the second support structure is chemically bonded to the first support structure of the second part, and the second support structure encloses at least a portion of each anchor on the plurality of plates, and where the second support structure mechanically maintains a fixed relationship between the first part that has anchors enclosed by the second support structure and the second part that is chemically bonded to the support structure.

Implementations may include one or more of the following features. The third material may be the same as the second material, and the third melt temperature may be the same as the second melt temperature. The first material may be an electrically conductive material, and the second and third materials may be electrically resistive materials. The first material may have an electrical conductivity of at least $1 \times 10^6 \, \Omega^{-1} \cdot m^{-1}$. One or more of the second material and the third material may have an electrical resistivity of at least $1 \times 10^6 \, \Omega \cdot m$. The second melt temperature and the third melt temperature may be between 150° C. and 350° C. The second melt temperature and the third melt temperature may be between 200° C. and 320° C. The first melt temperature may be between 450° C. and 2000° C. The first melt temperature may be at least 1000° C. The first material may be a metal. The metal may be stainless steel. Each pad of the plurality of pads may be formed via a stamping process. Each of the second material and the third material may be a polycarbonate. Each of the second material and the third material may be a polycarbonate/polybutylene terephthalate (PC/PBT) blend. Each of the second material and the third material may include a thermoplastic. The position of each pad may be maintained without use of any of adhesive, tape, or additional substrates. The at least one anchor may include at least two vertices with a notch formed therebetween. Each of the plurality of plates may include at least two anchors. Each of the plurality of plates may be laser welded to the first surface of its respective pad. Each of the plurality of plates may be formed via a stamping process. The first support structure may form at least a portion of the exterior surface of the device. The first support structure may define a window between the interior of the device and an exterior of the device. The device may include a sheet formed of an optically clear polymer, the sheet defining a lens disposed along the window. The device may include a fourth material having a melt temperature less than the first melt temperature, the fourth material chemically bonded to one or more of the first support structure and the second support structure. The plurality of pads, the first support structure, and the second support structure may form at least a portion of a lower housing for the device.

In an aspect, an assembly for a wearable physiological monitor disclosed herein may include: a first part, where the first part is formed of a first material having a first melt temperature, the first part includes a first surface, and the first part includes an anchor with an anchor feature having an anchor surface extending horizontally as the anchor feature extends vertically from the first surface; a second part, where the second part is formed of a second material having a second melt temperature lower than the first melt temperature, the second part includes an opening, and the first part is positioned adjacent to the second part with the anchor feature passing through the opening; and a third part, where the third part is formed of a third material having a third melt temperature lower than the first melt temperature, the third part is secured to the second part by a chemical bond, and the third part secures the first part relative to the second part by filling a volume between the anchor surface of the first part and an adjacent surface of the second part around the opening.

Implementations may include one or more of the following features. The third part may enclose at least a portion of the anchor feature. The chemical bond between the second part and the third part may create an environmental seal around the opening. The second part may include a rim structurally configured to laterally retain the first part relative to the second part. The assembly may form a waterproof enclosure for one or more electronic components. The assembly may include a sheet attached to the assembly, the sheet including an optically clear polymer positioned to cover one or more optical sensors of the assembly. The third material may be the same as the second material, and the third melt temperature may be the same as the second melt temperature. The first material may be an electrically conductive material, and the second and third materials may be electrically resistive materials. The second melt temperature and the third melt temperature may be between 150° C. and 350° C. The first melt temperature may be between 450° C. and 2000° C. The first material may be a metal. Each of the second material and the third material may be a polycarbonate. Each of the second material and the third material may include a thermoplastic. The anchor may include at least two vertices with a notch formed therebetween.

BRIEF DESCRIPTION OF THE DRAWINGS

The foregoing and other objects, features, and advantages of the devices, systems, and methods described herein will be apparent from the following description of particular embodiments thereof, as illustrated in the accompanying drawings. The drawings are not necessarily to scale, emphasis instead being placed upon illustrating the principles of the devices, systems, and methods described herein. In the drawings, like reference numerals generally identify corresponding elements.

DETAILED DESCRIPTION

Figure 1:
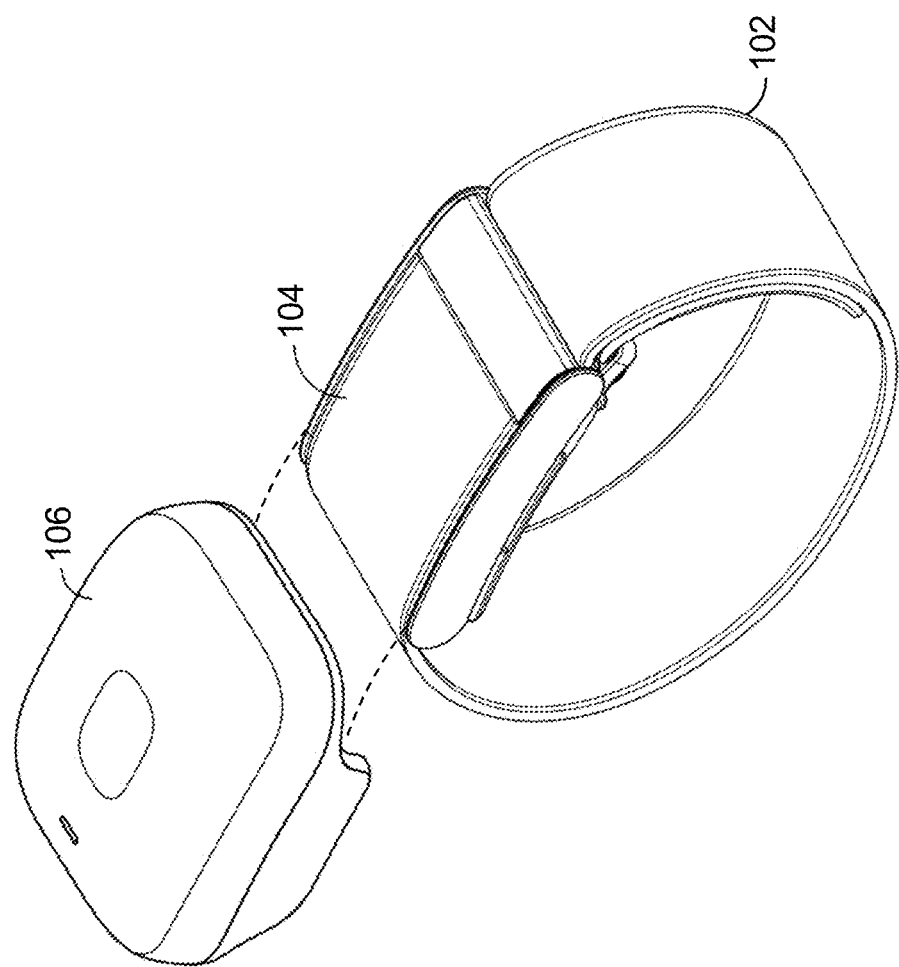
FIG. 1 shows a physiological monitoring device.
Figure 1:
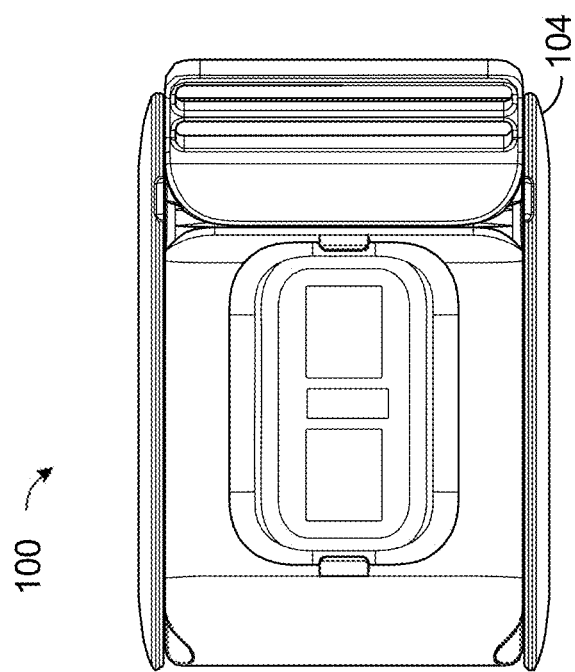

The embodiments will now be described more fully hereinafter with reference to the accompanying figures, in which preferred embodiments are shown. The foregoing may, however, be embodied in many different forms and should not be construed as limited to the illustrated embodiments set forth herein. Rather, these illustrated embodiments are provided so that this disclosure will convey the scope to those skilled in the art.

All documents mentioned herein are hereby incorporated by reference in their entirety. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately" or the like, when accompanying a numerical value, are to be construed as indicating a deviation as would be appreciated by one of ordinary skill in the art to operate satisfactorily for an intended purpose. Similarly, words of approximation such as "approximately" or "substantially" when used in reference to physical characteristics, should be understood to contemplate a range of deviations that would be appreciated by one of ordinary skill in the art to operate satisfactorily for a corresponding use, function, purpose, or the like. Ranges of values and/or numeric values are provided herein as examples only, and do not constitute a limitation on the scope of the described embodiments. Where ranges of values are provided, they are also intended to include each value within the range as if set forth individually, unless expressly stated to the contrary. The use of any and all examples, or exemplary language ("e.g.," "such as," or the like) provided herein, is intended merely to better describe the embodiments and does not pose a limitation on the scope of the embodiments. No language in the specification should be construed as indicating any unclaimed element as essential to the practice of the embodiments.

In the following description, it is understood that terms such as "first," "second," "top," "bottom," "up," "down," "above," "below," and the like, are words of convenience and are not to be construed as limiting terms unless specifically stated to the contrary.

The term "user" as used herein, refers to any type of animal, human or non-human, whose physiological information may be monitored using an exemplary wearable physiological monitoring system.

The term "continuous," as used herein in connection with heart rate data, refers to the acquisition of heart rate data at a sufficient frequency to enable detection of individual heartbeats, and also refers to the collection of heart rate data over extended periods such as an hour, a day or more (including acquisition throughout the day and night). More generally with respect to physiological signals that might be monitored by a wearable device, "continuous" or "continuously" will be understood to mean continuously at a rate and duration suitable for the intended time-based processing, and physically at an inter-periodic rate (e.g., multiple times per heartbeat, respiration, and so forth) sufficient for resolving the desired physiological characteristics such as heart rate, heart rate variability, heart rate peak detection, pulse shape, and so forth. At the same time, continuous monitoring is not intended to exclude ordinary data acquisition interruptions such as temporary displacement of monitoring hardware due to sudden movements, changes in external lighting, loss of electrical power, physical manipulation and/or adjustment by a wearer, physical displacement of monitoring hardware due to external forces, and so forth. It will also be noted that heart rate data or a monitored heart rate, in this context, may more generally refer to raw sensor data such as optical intensity signals, or processed data therefrom such as heart rate data, signal peak data, heart rate variability data, or any other physiological or digital signal suitable for recovering heart rate information as contemplated herein. Furthermore, such heart rate data may generally be captured over some historical period that can be subsequently correlated to various other data or metrics related to, e.g., sleep states, recognized exercise activities, resting heart rate, maximum heart rate, and so forth.

The term "computer-readable medium," as used herein, refers to a non-transitory storage media such as storage hardware, storage devices, computer memory that may be accessed by a controller, a microcontroller, a microprocessor, a computational system, or the like, or any other module or component or module of a computational system to encode thereon computer-executable instructions, software programs, and/or other data. The "computer-readable medium" may be accessed by a computational system or a module of a computational system to retrieve and/or execute the computer-executable instructions or software programs encoded on the medium. The non-transitory computer-readable media may include, but are not limited to, one or more types of hardware memory, non-transitory tangible media (for example, one or more magnetic storage disks, one or more optical disks, one or more USB flash drives), virtual or physical computer system memory, physical memory hardware such as random access memory (such as, DRAM, SRAM, EDO RAM), and so forth. Although not depicted, any of the devices or components described herein may include a computer-readable medium or other memory for storing program instructions, data, and the like.

FIG. 1 shows a physiological monitoring system. The system 100 may include a wearable monitor 104 that is configured for physiological monitoring. The system 100 may also include a removable and replaceable battery 106 for recharging the wearable monitor 104. The wearable monitor 104 may include a strap 102 or other retaining system(s) for securing the wearable monitor 104 in a position on a wearer's body for the acquisition of physiological data as described herein. For example, the strap 102 may include a slim elastic band formed of any suitable elastic material such as a rubber or a woven polymer fiber such as a woven polyester, polypropylene, nylon, spandex, and so forth. The strap 102 may be adjustable to accommodate different wrist sizes, and may include any latches, hasps, or the like to secure the wearable monitor 104 in an intended position for monitoring a physiological signal. While a wrist-worn device is depicted, it will be understood that the wearable monitor 104 may be configured for positioning in any suitable location on a user's body, based on the sensing modality and the nature of the signal to be acquired. For example, the wearable monitor 104 may be configured for use on a wrist, an ankle, a bicep, a chest, or any other suitable location(s), and the strap 102 may be, or may include, a waistband or other elastic band or the like within an article of clothing or accessory. The wearable monitor 104 may also or instead be structurally configured for placement on or within a garment, e.g., permanently or in a removable and replaceable manner. To that end, the wearable monitor 104 may be shaped and sized for placement within a pocket, slot, and/or other housing that is coupled to or embedded within a garment. In such configurations, the pocket or other retaining arrangement on the garment may include sensing windows or the like so that the wearable monitor 104 can operate while placed for use in the garment. U.S. Pat. No. 11,185,292 describes non-limiting example embodiments of suitable wearable monitors 104, and is incorporated herein by reference in its entirety.

The system 100 may include any hardware components, subsystems, and the like to support various functions of the wearable monitor 104 such as data collection, processing, display, and communications with external resources. For example, the system 100 may include hardware for a heart rate monitor using, e.g., photoplethysmography, electrocardiogram any other technique(s). The system 100 may be configured such that, when the wearable monitor 104 is placed for use about a wrist (or at some other body location), the system 100 initiates acquisition of physiological data from the wearer. In some embodiments, the pulse or heart rate may be acquired optically based on a light source (such as light emitting diodes (LEDs)) and optical detectors in the wearable monitor 104. The LEDs may be positioned to direct illumination toward the user's skin, and optical detectors such as photodiodes may be used to capture illumination intensity measurements indicative of illumination from the LEDs that is reflected and/or transmitted by the wearer's skin.

The system 100 may be configured to record other physiological and/or biomechanical parameters including, but not limited to, skin temperature (using a thermometer), galvanic skin response (using a galvanic skin response sensor), motion (using one or more multi-axes accelerometers and/or gyroscope), blood pressure, and the like, as well environmental or contextual parameters such as ambient light, ambient temperature, humidity, time of day, and so forth. For example, the wearable monitor 104 may include sensors such as accelerometers and/or gyroscopes for motion detection, sensors for environmental temperature sensing, sensors to measure electrodermal activity (EDA), sensors to measure galvanic skin response (GSR) sensing, and so forth. The system 100 may also or instead include other systems or subsystems supporting addition functions of the wearable monitor 104. For example, the system 100 may include communications systems to support, e.g., near field communications, proximity sensing, Bluetooth communications, Wi-Fi communications, cellular communications, satellite communications, and so forth. The wearable monitor 104 may also or instead include components such as a geopositioning system (e.g., based on the Global Positioning System or GPS), a display and/or user interface, a clock and/or timer, and so forth.

The wearable monitor 104 may include one or more sources of battery power, such as a first battery within the wearable monitor 104 and a second battery 106 that is removable from and replaceable to the wearable monitor 104 in order to recharge the battery in the wearable monitor 104. Also or instead, the system 100 may include a plurality of wearable monitors 104 (and/or other physiological monitors) that can share battery power or provide power to one another. The system 100 may perform numerous functions related to continuous monitoring, such as automatically detecting when the user is asleep, awake, exercising, and so forth, and such detections may be performed locally at the wearable monitor 104 or at a remote service coupled in a communicating relationship with the wearable monitor 104 and receiving data therefrom. In general, the system 100 may support continuous, independent monitoring of a physiological signal such as a heart rate, and the underlying acquired data may be stored on the wearable monitor 104 for an extended period until it can be uploaded to a remote processing resource for more computationally complex analysis.

In one aspect, the wearable monitor may be a wrist-worn photoplethysmography device.

Figure 2:
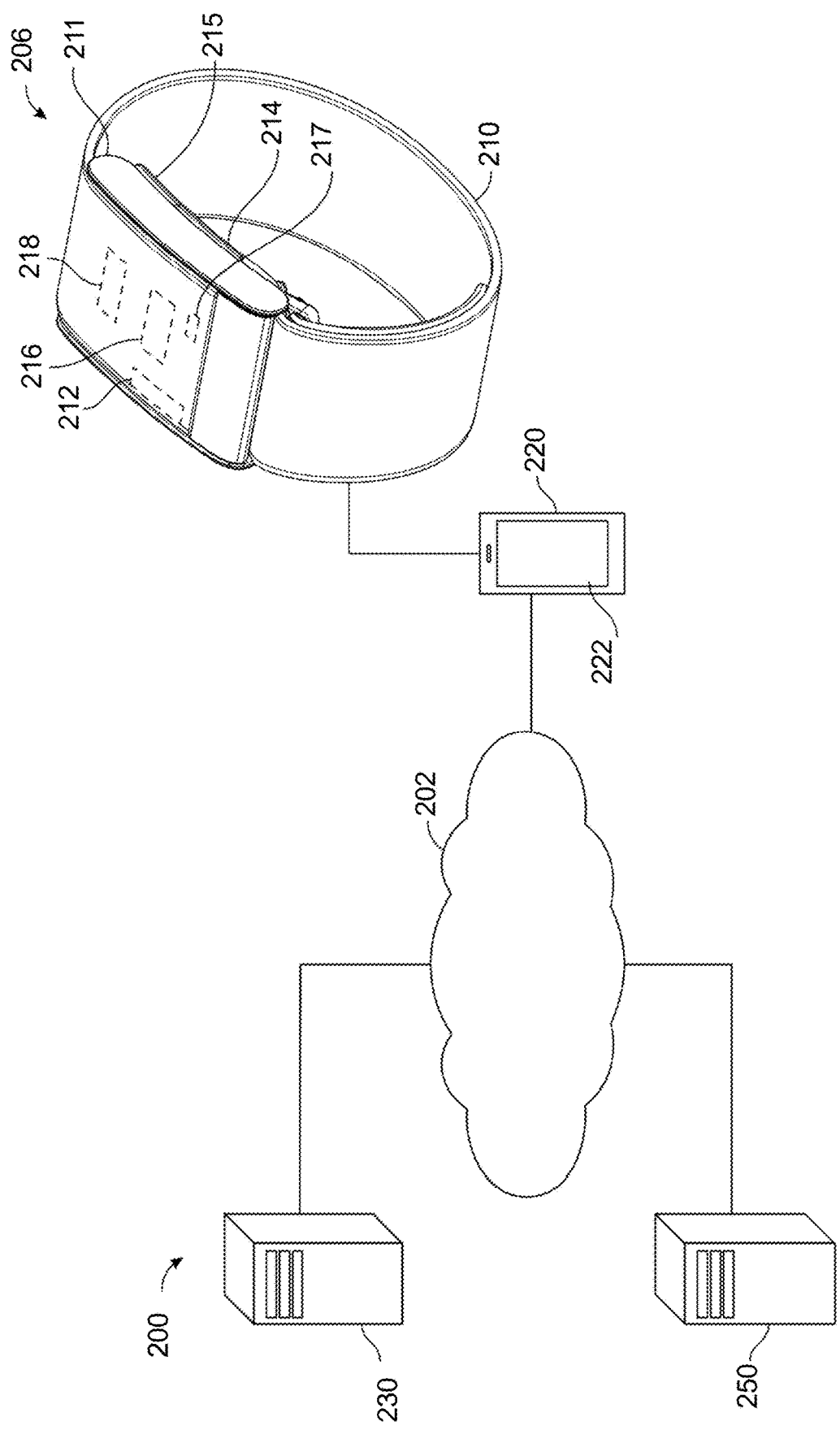
FIG. 2 illustrates a physiological monitoring system.

FIG. 2 illustrates a physiological monitoring system. More specifically, FIG. 2 illustrates a physiological monitoring system 200 that may be used with any of the methods or devices described herein. In general, the system 200 may include a physiological monitor 206, a user device 220, a remote server 230 with a remote data processing resource (such as any of the processors or processing resources described herein), and one or more other resources 250, all of which may be interconnected through a data network 202.

The data network 202 may be any of the data networks described herein. For example, the data network 202 may be any network(s) or internetwork(s) suitable for communicating data and information among participants in the system 200. This may include public networks such as the Internet, private networks, telecommunications networks such as the Public Switched Telephone Network or cellular networks using third generation (e.g., 3G or IMT-200), fourth generation (e.g., LTE (E-UTRA) or WiMAX-Advanced (IEEE 802.16m)), fifth generation (e.g., 5G), and/or other technologies, as well as any of a variety of corporate area or local area networks and other switches, routers, hubs, gateways, and the like that might be used to carry data among participants in the system 200. This may also include local or short-range communications infrastructure suitable, e.g., for coupling the physiological monitor 206 to the user device 220, or otherwise supporting communicating with local resources. By way of non-limiting examples, short range communications may include Wi-Fi communications, Bluetooth communications, infrared communications, near field communications, communications with RFID tags or readers, and so forth.

The physiological monitor 206 may, in general, be any physiological monitoring device or system, such as any of the wearable monitors or other monitoring devices or systems described herein. In one aspect, the physiological monitor 206 may be a wearable physiological monitor shaped and sized to be worn on a wrist or other body location. The physiological monitor 206 may include a wearable housing 211, a network interface 212, one or more sensors 214, one or more light sources 215, a processor 216, a haptic device 217 or other user input/output hardware, a memory 218, and a strap 210 for retaining the physiological monitor 206 in a desired location on a user. In one aspect, the physiological monitor 206 may be configured to acquire heart rate data and/or other physiological data from a wearer in an intermittent or substantially continuous manner. In another aspect, the physiological monitor 206 may be configured to support extended, continuous acquisition of physiological data, e.g., for several days, a week, or more.

The network interface 212 of the physiological monitor 206 may be configured to couple the physiological monitor 206 to one or more other components of the system 200 in a communicating relationship, either directly, e.g., through a cellular data connection or the like, or indirectly through a short range wireless communications channel coupling the physiological monitor 206 locally to a wireless access point, router, computer, laptop, tablet, cellular phone, or other device that can locally process data, and/or relay data from the physiological monitor 206 to the remote server 230 or other resource(s) 250 as necessary or helpful for acquiring and processing data from the physiological monitor 206.

The one or more sensors 214 may include any of the sensors described herein, or any other sensors or subsystems suitable for physiological monitoring or supporting functions. By way of example and not limitation, the one or more sensors 214 may include one or more of a light source, an optical sensor, an accelerometer, a gyroscope, a temperature sensor, a galvanic skin response sensor, a capacitive sensor, a resistive sensor, an environmental sensor (e.g., for measuring ambient temperature, humidity, lighting, and the like), a geolocation sensor, Global Positioning System hardware/software, a proximity sensor, an RFID tag reader, and RFID tag, a temporal sensor, an electrodermal activity sensor, and the like. The one or more sensors 214 may be disposed in the wearable housing 211, or otherwise positioned and configured for physiological monitoring or other functions described herein. In one aspect, the one or more sensors 214 include a light detector configured to provide light intensity data to the processor 216 (or to the remote server 230) for calculating a heart rate and a heart rate variability. The one or more sensors 214 may also or instead include an accelerometer, gyroscope, and the like configured to provide motion data to the processor 216, e.g., for detecting activities such as a sleep state, a resting state, a waking event, exercise, and/or other user activity. In an implementation, the one or more sensors 214 may include a sensor to measure a galvanic skin response of the user. The one or more sensors 214 may also or instead include electrodes or the like for capturing electronic signals, e.g., to obtain an electrocardiogram and/or other electrically-derived physiological measurements.

The processor 216 and memory 218 may be any of the processors and memories described herein. In one aspect, the memory 218 may store physiological data obtained by monitoring a user with the one or more sensors 214, and or any other sensor data, program data, or other data useful for operation of the physiological monitor 206 or other components of the system 200. It will be understood that, while only the memory 218 on the physiological monitor is illustrated, any other device(s) or components of the system 200 may also or instead include a memory to store program instructions, raw data, processed data, user inputs, and so forth. In one aspect, the processor 216 of the physiological monitor 206 may be configured to obtain heart rate data from the user, such as heart rate data including or based on the raw data from the sensors 214. The processor 216 may also or instead be configured to determine, or assist in a determination of, a condition of the user related to, e.g., health, fitness, strain, recovery sleep, or any of the other conditions described herein.

The one or more light sources 215 may be coupled to the wearable housing 211 and controlled by the processor 216. At least one of the light sources 215 may be directed toward the skin of a user adjacent to the wearable housing 211. Light from the light source 215, or more generally, light at one or more wavelengths of the light source 215, may be detected by one or more of the sensors 214, and processed by the processor 216 as described herein.

The system 200 may further include a remote data processing resource executing on a remote server 230. The remote data processing resource may include any of the processors and related hardware described herein, and may be configured to receive data transmitted from the memory 218 of the physiological monitor 206, and to process the data to detect or infer physiological signals of interest such as heart rate, heart rate variability, respiratory rate, pulse oxygen, blood pressure, and so forth. The remote server 230 may also or instead evaluate a condition of the user such as a recovery state, sleep state, exercise activity, exercise type, sleep quality, daily activity strain, and any other health or fitness conditions that might be detected based on such data.

The system 200 may include one or more user devices 220, which may work together with the physiological monitor 206, e.g., to provide a display, or more generally, user input/output, for user data and analysis, and/or to provide a communications bridge from the network interface 212 of the physiological monitor 206 to the data network 202 and the remote server 230. For example, physiological monitor 206 may communicate locally with a user device 220, such as a smartphone of a user, via short-range communications, e.g., Bluetooth, or the like, for the exchange of data between the physiological monitor 206 and the user device 220, and the user device 220 may in turn communicate with the remote server 230 via the data network 202 in order to forward data from the physiological monitor 206 and to receive analysis and results from the remote server 230 for presentation to the user. In one aspect, the user device(s) 220 may support physiological monitoring by processing or pre-processing data from the physiological monitor 206 to support extraction of heart rate or heart rate variability data from raw data obtained by the physiological monitor 206. In another aspect, computationally intensive processing may advantageously be performed at the remote server 230, which may have greater memory capabilities and processing power than the physiological monitor 206 and/or the user device 220.

The user device 220 may include any suitable computing device(s) including, without limitation, a smartphone, a desktop computer, a laptop computer, a network computer, a tablet, a mobile device, a portable digital assistant, a cellular phone, a portable media or entertainment device, or any other computing devices described herein. The user device 220 may provide a user interface 222 for access to data and analysis by a user, and/or to support user control of operation of the physiological monitor 206. The user interface 222 may be maintained by one or more applications executing locally on the user device 220, or the user interface 222 may be remotely served and presented on the user device 220, e.g., from the remote server 230 or the one or more other resources 250.

In general, the remote server 230 may include data storage, a network interface, and/or other processing circuitry. The remote server 230 may process data from the physiological monitor 206 and perform physiological and/or health monitoring/analyses or any of the other analyses described herein, (e.g., analyzing sleep, determining strain, assessing recovery, and so on), and may host a user interface for remote access to this data, e.g., from the user device 220. The remote server 230 may include a web server or other programmatic front end that facilitates web-based access by the user devices 220 or the physiological monitor 206 to the capabilities of the remote server 230 or other components of the system 200.

The system 200 may include other resources 250, such as any resources that can be usefully employed in the devices, systems, and methods as described herein. For example, these other resources 250 may include other data networks, databases, processing resources, cloud data storage, data mining tools, computational tools, data monitoring tools, algorithms, and so forth. In another aspect, the other resources 250 may include one or more administrative or programmatic interfaces for human actors such as programmers, researchers, annotators, editors, analysts, coaches, and so forth, to interact with any of the foregoing. The other resources 250 may also or instead include any other software or hardware resources that may be usefully employed in the networked applications as contemplated herein. For example, the other resources 250 may include payment processing servers or platforms used to authorize payment for access, content, or option/feature purchases. In another aspect, the other resources 250 may include certificate servers or other security resources for third-party verification of identity, encryption or decryption of data, and so forth. In another aspect, the other resources 250 may include a desktop computer or the like co-located (e.g., on the same local area network with, or directly coupled to through a serial or USB cable) with a user device 220, wearable strap 210, or remote server 230. In this case, the other resources 250 may provide supplemental functions for components of the system 200 such as firmware upgrades, user interfaces, and storage and/or pre-processing of data from the physiological monitor 206 before transmission to the remote server 230.

The other resources 250 may also or instead include one or more web servers that provide web-based access to and from any of the other participants in the system 200. While depicted as a separate network entity, it will be readily appreciated that the other resources 250 (e.g., a web server) may also or instead be logically and/or physically associated with one of the other devices described herein, and may for example, include or provide a user interface 222 for web access to the remote server 230 or a database or other resource(s) to facilitate user interaction through the data network 202, e.g., from the physiological monitor 206 or the user device 220.

In another aspect, the other resources 250 may include fitness equipment or other fitness infrastructure. For example, a strength training machine may automatically record repetitions and/or added weight during repetitions, which may be wirelessly accessible by the physiological monitor 206 or some other user device 220. More generally, a gym may be configured to track user movement from machine to machine, and report activity from each machine in order to track various strength training activities in a workout. The other resources 250 may also or instead include other monitoring equipment or infrastructure. For example, the system 200 may include one or more cameras to track motion of free weights and/or the body position of the user during repetitions of a strength training activity or the like. Similarly, a user may wear, or have embedded in clothing, tracking fiducials such as visually distinguishable objects for image-based tracking, or radio beacons or the like for other tracking. In another aspect, weights may themselves be instrumented, e.g., with sensors to record and communicated detected motion, and/or beacons or the like to self-identify type, weight, and so forth, in order to facilitate automated detection and tracking of exercise activity with other connected devices.

The present teachings generally include devices, systems, and techniques for securely assembling a multi-part housing for an electronic device such as any of the wearable physiological monitoring devices described herein. In one aspect, the multi-part housing may be a waterproof, water-resistant, or otherwise environmentally sealed housing for electronic components of a physiological monitoring device or the like. The term "waterproof" as used herein shall include (but is not necessarily be limited to) waterproof as specified in international standards such as the Ingress Protection (IP) rating system. For example, "waterproof" as used herein may include waterproof as specified in IP67 (i.e., dust-tight and water-resistant to a depth of 1 meter for 30 minutes) or IP68 (i.e., dust-tight and water resistant to a depth of 1.5 meters for up to 30 minutes). While these are generally accepted standards for water resistance, other standards or specifications, including more rigorous standards and specifications, may also or instead be used.

Achieving a waterproof enclosure under these conditions can prove difficult when different materials are used in a multi-part assembly, such as materials having different melt temperatures, different coefficients of thermal expansion, different surface properties, different electrical conductance, and/or poor inter-material bonding properties. By way of example, if a housing includes both a metal material and a plastic material, this can pose a challenge for techniques such as insert molding where the metal will not or may not bond particularly well to an overmolded plastic—i.e., the plastic will generally not bond to or form a water-tight seal around the metal, which can lead to separation and/or waterproofing failures. In some instances, tapes, epoxies, or other adhesives may be used to adhere metals and plastics in a watertight seal, but these techniques can have their own challenges. For example, gluing metals to plastics can lead to gaps between the metal and plastic; and, in wearable electronic devices, gaps are known to cause skin irritation and/or increase a risk of contact dermatitis. Furthermore, metal and plastic generally have different coefficients of thermal expansion, and thus it is more likely that these different materials will separate over the lifetime of a product due to, e.g., thermal cycling.

To overcome such challenges and to provide a waterproof enclosure for an electronic device, it may thus be desirable to mechanically secure different materials to each other when forming the enclosure/assembly, e.g., without using or relying upon adhesives such as glue, tape, and/or the like. In this manner, the present teachings may include a mechanically secured enclosure for an electronic device that is formed of at least two different materials, e.g., a first part formed of a first material (e.g., a metal) and a second part formed of a second material (e.g., a plastic). The first part may include an anchor projecting from a surface thereof, and the second part may form a support structure or framework, along with an opening that receives the anchor of the first part therein. Positioned in this manner, a third part may be formed that surrounds the anchor and chemically bonds to the second part, e.g., by injection molding or otherwise forming the third part onto the second part and into a volume between the anchor of the first part and the surface of the second part. The second part and the third part may be chemically bonded, e.g., in an injection molding process, to form a continuous enclosing surface, while the third part also forms around the anchor of the first part to mechanically retain the first part in a fixed relationship to the second and third parts. In one aspect, the continuous enclosing surface of the second and third part can provide waterproof barrier for a housing or the like—i.e., the second and third parts may chemically bond such that their continuous, enclosed surface provides a waterproof barrier for the housing despite having a first part present thereon that is not chemically bonded to the housing. In another aspect, the anchor may shaped and sized to extend vertically as it extends horizontally from a surface of the first part, thus providing a mechanically interlocked structure to prevent the first (e.g., metallic) part from separating from the third part formed around it. While this type of horizontally extending overhang may usefully resist separation of the first part, any other shape or combination of shapes or structures may be used that geometrically interlocks the third part and the first part, and/or that avoids a linear draw path for removal of the first part from the third part. In one aspect, the chemical bond between the second part and the third part secures the first part in position. In another aspect, by filling a volume between the anchor and the second part, the third part may provide additional structural support for this interlocked relationship.

In one example, during manufacturing, the first part and the second part may be aligned such that one or more anchors of the first part extend into an interior volume of the second part, and then a third material capable of bonding with the second part may be injection molded to fill a portion of that interior volume. In this manner, the third material may form a seal around the one or more anchors, which, in combination with the chemical bond between the third material and the second material, mechanically bonds the first part to the second part. In this configuration, the anchor(s) may serve as a mechanical interlock that mechanically engages the anchor(s) to the third part in three dimensions, increasing the structural integrity of the connection and limiting the likelihood of separation of the first, second, and third parts over the lifetime of an electronic device, housing, or the like.

It will be understood that, although this disclosure may emphasize enclosures for wearable monitors, these techniques may also or instead be used with other types of electronic and non-electronic devices, such as any multi-material device for which environmental sealing is desired. For example, this may be used with watches, GPS tracking devices, phones, personal electronic devices, outdoor electronics, and so forth. Further, although this disclosure describes embodiments using, e.g., metal parts and injection molded plastics, other types of materials may also or instead be used. For example, the techniques described herein may be used with different types of thermoplastics, polymers, and so forth, as well as different types of metals, ceramics, glasses, and other materials that do not chemically bond (or bond poorly) with such materials. In general, the different materials may have substantially different melting temperatures and/or electrical conductivity, where creating a waterproof assembly from these disparate materials absent the use of the present teachings can be challenging.

Figure 3:
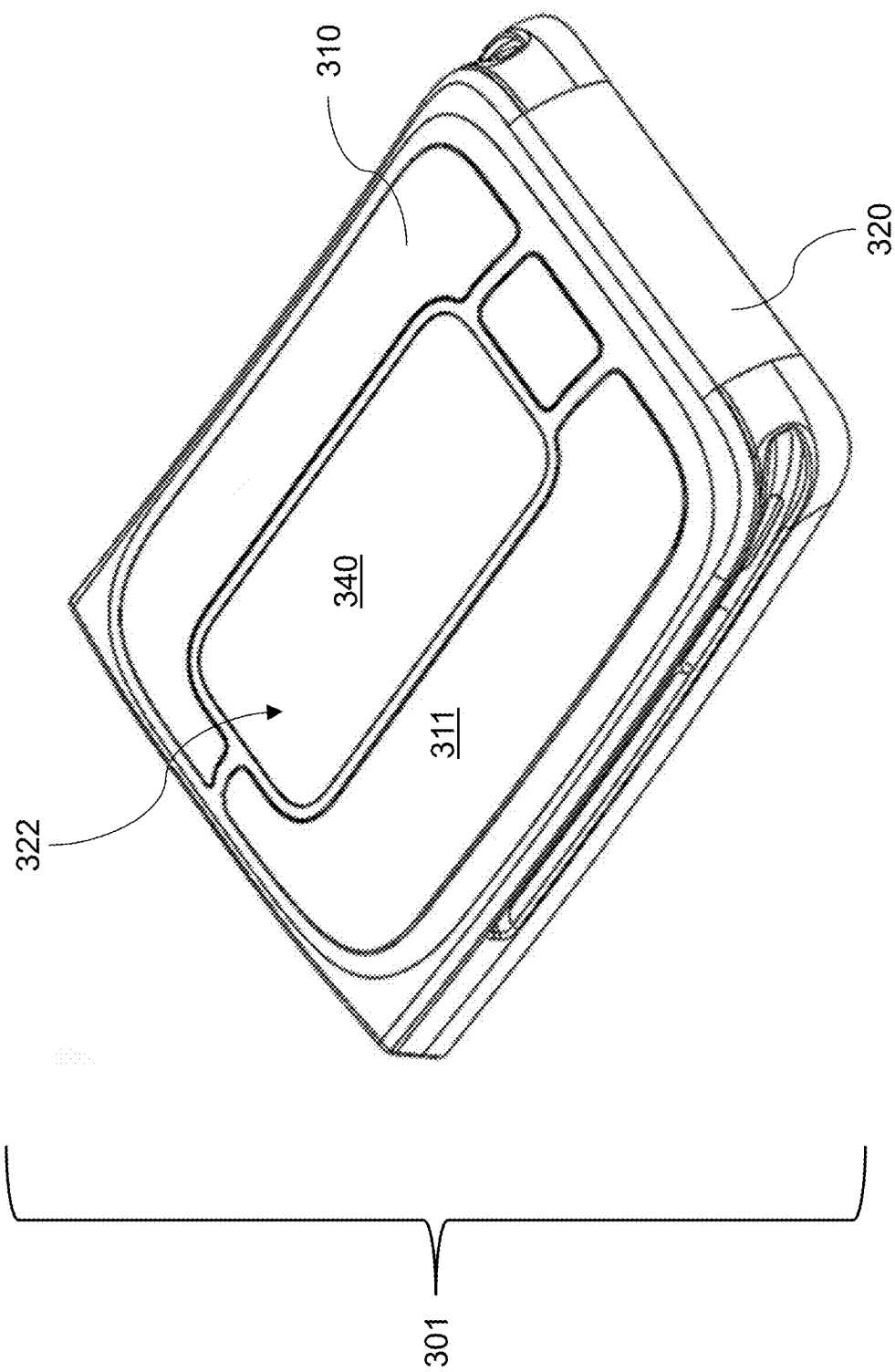
FIG. 3 shows a portion of a housing of a physiological monitoring device.
Figure 5:
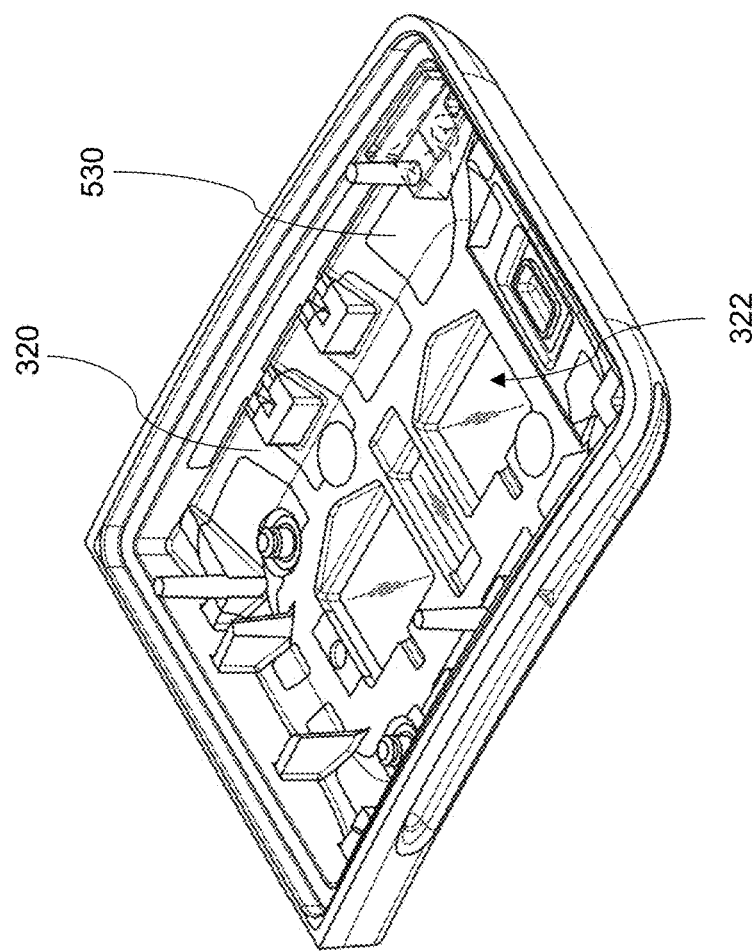
FIG. 5 shows a second view of a portion of a housing of a physiological monitoring device.
Figure 4:
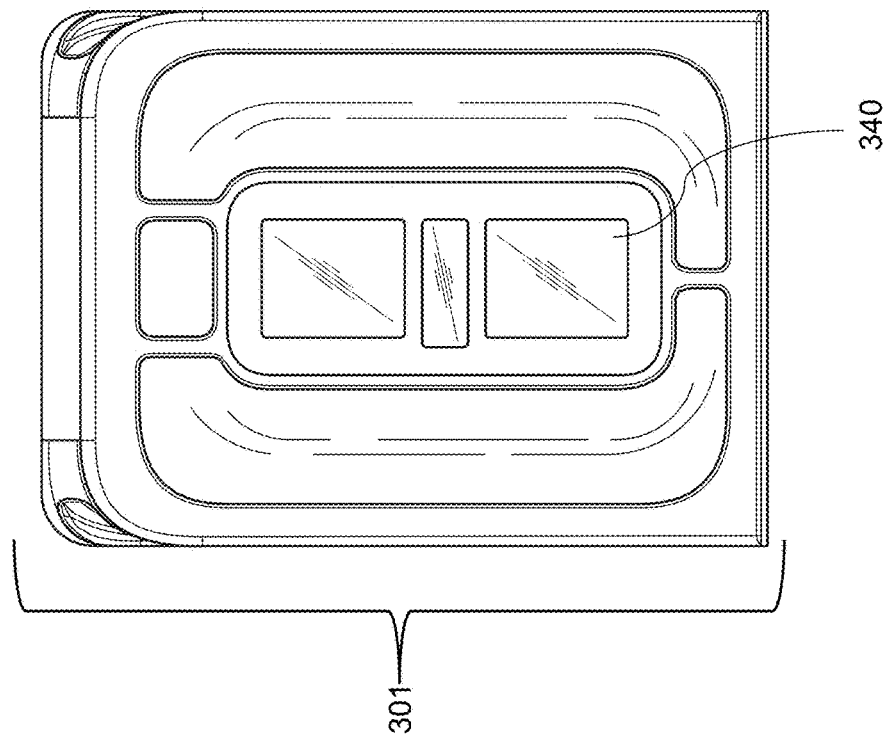
FIG. 4 shows a first view of a portion of a housing of a physiological monitoring device.

FIGS. 3-5 show a portion of a housing of a physiological monitoring device. In general, FIGS. 3-5 show an example of a lower portion of a housing 301 that forms an enclosure for a physiological monitoring device, e.g., where the enclosure is formed when the lower portion is coupled with one or more other opposing portions of the physiological monitoring device, e.g., an upper portion (not shown). Specifically, FIGS. 3 and 4 show examples of an exterior of a lower portion of a housing 301 of the physiological monitoring device, and FIG. 5 shows an example of an interior of the lower portion of the housing 301 of the physiological monitoring device. The exterior surface formed by the lower portion of the housing 301 may, for example, for a bottom surface of the device that is intended to contact skin of a wearer. The enclosure may be structurally configured to house electronic components therein, and may be waterproof or otherwise environmentally sealed. In general, the physiological monitoring device may be any as described herein, and may for example include a waterproof wearable physiological monitoring device. It will be understood that the physiological monitoring device may be referred to as a physiological monitor, a monitor, a device, a monitoring device, and the like, and these terms are generally intended to be construed synonymously unless expressly stated to the contrary or otherwise apparent from the context.

The lower portion of the physiological monitoring device may be structurally configured to accommodate processing hardware, sensors, optics, and the like for physiological monitoring and/or sensing such as photoplethysmography, optical sensing, electrocardiogra (ECG), temperature monitoring, blood pressure measurement, galvanic skin response sensing, and the like. For example, a lower portion of the physiological monitoring device may include a first part 310 (e.g., one or more pads 311 providing electrical contacts suitable for use in obtaining ECG measurements, i.e., an electrode), a second part 320 that forms a first support structure (e.g., for securing other elements therein, thereto, and/or thereon), a third part 530 (see FIG. 5) that forms a second support structure assisting in securing the first part 310 to the second part 320 in a fixed manner, and a sheet 340 that provides a lens or cover for sensors of the physiological monitoring device. Each of these components may be made from a different material than one or more of the other components, and the techniques disclosed herein may be used to couple these disparate materials in a waterproof barrier for a housing 301 that contains, e.g., electronics and other components for which environmental sealing is desired.

The first part 310 may include one or more pads 311 as explained above, such as an electrode for an ECG pad or the like suitable for use in electrocardiogramar measuring the electrical activity of the heart over a period of time through contact with the skin of a wearer of the physiological monitoring device. To this end, each pad 311 may be made from a first material that is electrically conductive, i.e., a material allowing for the efficient transmission of electrical signals from the body to ECG circuitry included within the housing 301 of the physiological monitoring device. By way of example, the first material of one or more of the pads 311 may have an electrical conductivity of at least $1\times10^6$ $\Omega^{-1}\cdot m^{-1}$. In certain implementations, the first material is a metal. For example, the first material may be stainless steel, gold, silver, or other oxidation-resistant, conductive metallics. However, non-metals may also be used. For example, the first material may be an elastomeric material with conductive properties, a carbon film, a ceramic, a glass, and the like. In some instances, the pads 311 include a non-metal with embedded conductive elements to provide desired conductivity, e.g., into internal components within the housing 301. In other aspects, the first part 310 may be a non-conductive part formed, e.g., of any material suitable for coupling to other materials as described herein.

The second part 320 may include a first support structure that is structurally configured to receive at least a portion of the first part 310 therein and/or thereon. For example, the pads 311 may sit within one or more recesses or openings included in the first support structure. The second part 320 may form at least a portion of an exterior surface of the physiological monitoring device, e.g., with the exterior surface of the pads 311 similarly exposed on an exterior surface of the housing 311 for the physiological monitoring device. This may usefully provide an electrical sensing surface, e.g., for detecting contact or for obtaining ECG data, muscle activity data, and so forth. The exterior surface may include and/or form some or all of a bottom surface of the wearable device. However, it shall be understood that the exterior surface may also or instead include a top surface or side surface of the device, such as where ECG electrodes are disposed on the top of the device where a user can contact the electrode(s) with a finger for ECG measurements, or where a contact-based user input is desired. It will be understood that terms such as top, bottom, upper, and lower are generally provided for reference and convenience, and should not be understood to require a particular arrangement or orientation unless explicitly stated or otherwise clear from the context.

The second part 320 may be formed wholly or substantially of a second material that is different from the first material of the first part 310. For example, the first material of the first part 310 may be a metal, a ceramic, or the like having a first melt temperature, and the second material of the second part 320 may have a second melt temperature that is lower than the first melt temperature. By way of example, the first melt temperature may be between 450° C. and 2000° C. And, in some aspects, the first melt temperature is at least 1000° C. The second melt temperature may be between 150° C. and 350° C. In some aspects, the second melt temperature is between 200° C. and 320° C. Thus, in some aspects, the first part 310 has a higher melt temperature than the second part 320. More generally, the second part 320 may be formed of a material suitable for injection molding, casting, or otherwise thermoforming around the first part 310 without altering the first part 310. Furthermore, in some aspects, the first material is an electrically conductive material, and the second material is an electrically resistive material. For example, the second material may have an electrical resistivity of at least $1\times10^6$ $\Omega\cdot m$, and the first material may have an electrical conductivity of at least $1\times10^6$ $\Omega^{-1}\cdot m^{-1}$.

The second material of the second part 320 may be a plastic. For example, the second material may be a polycarbonate, such as a polycarbonate/polybutylene terephthalate (PC/PBT) blend or similar. In some aspects, the second material includes a thermoplastic or other injection moldable material. Other materials may also or instead be used.

The third part 530 (see FIG. 5) may include a second support structure formed substantially of a third material that is different than the first material of the first part 310. For example, the third material may have a third melt temperature that is lower than the first melt temperature of the first part 310. In some aspects, the third material is the same as the second material (e.g., a plastic), and the third melt temperature may be the same (or nearly the same) as the second melt temperature (e.g., between 150° C. and 350° C., where the first melt temperature is between 450° C. and 2000° C.). Also or instead, the first material may be an electrically conductive material, and the second and third materials may be electrically resistive materials. For example, each of the second material and the third material may be a polycarbonate, a thermoplastic, or the like.

The second support structure of the third part 530 may be chemically bonded to the first support structure of the second part 320. The second support structure of the third part 530 may interlock the first part 310 and the second part 320, e.g., to mechanically maintain a fixed relationship between the first part 310 and the second part 320. For example, in certain aspects, the third part 530 may be formed around the anchoring structures of the first part 310 such that the position of each pad 311 of the first part 310 is maintained relative to the third part 530 without the use of any of adhesives (e.g., glue, epoxy, or similar), tapes, or additional substrates. With the third part chemically bonded to the second part 320, e.g., during an injection molding process, thermoforming process, or the like, the three parts 310, 320, 530 may be mechanically interlocked with and connected to one another in a manner that forms a water-impermeable barrier between an exterior surface and interior surface of the multi-part assembly, while permitting external exposure for the first part 310 that is formed of the different material. As a significant advantage, this structure forms a waterproof barrier with the chemically bonded joints between the second part 320 and the third part 530, which advantageously avoids reliance on adhesives, spot welds, or other assembly techniques that can delaminate or degrade over time. Thus, certain aspects include devices and multi-part assemblies with waterproof (e.g., hermetically sealed) barriers that do not rely on adhesives or the like, while permitting functional exposure of a material of a separate part, such as the first part 310, for use as a contact pad or the like.

The sheet 340 may be disposed along a window 322 defined by the first support structure of the second part 320 between the interior of the physiological monitoring device and an exterior of the physiological monitoring device. The sheet 340 may define a lens or other optical interface or the like between the interior of the physiological monitoring device and an exterior of the physiological monitoring device, e.g., to facilitate optical sensing therethrough. To this end, the sheet 340 may be formed of an optically clear polymer. The sheet 340 may be affixed to the second part 320 through the use of a fourth material that is chemically bonded to one or more of the first support structure and the second support structure. In some aspects, the fourth material has a melt temperature less than the first melt temperature of the first material used to form the first part 310. The fourth material may be the same as the second material of the second part 320, which again, may be the same as the third material of the third part 530, or may be some other material, e.g., with similar melting properties to permit chemical bonding when forming one material onto the other.

As shown in FIGS. 3-5, in some aspects, the plurality of pads 311, the first support structure of the second part 320, and the second support structure of the third part 530 may form at least a portion of a housing for the physiological monitoring device, e.g., a lower portion (that contacts a user's skin for sensing) or an upper portion (away from the skin, but potentially also including contact surfaces, e.g., for user input, sensing, and so forth).

Figure 6:
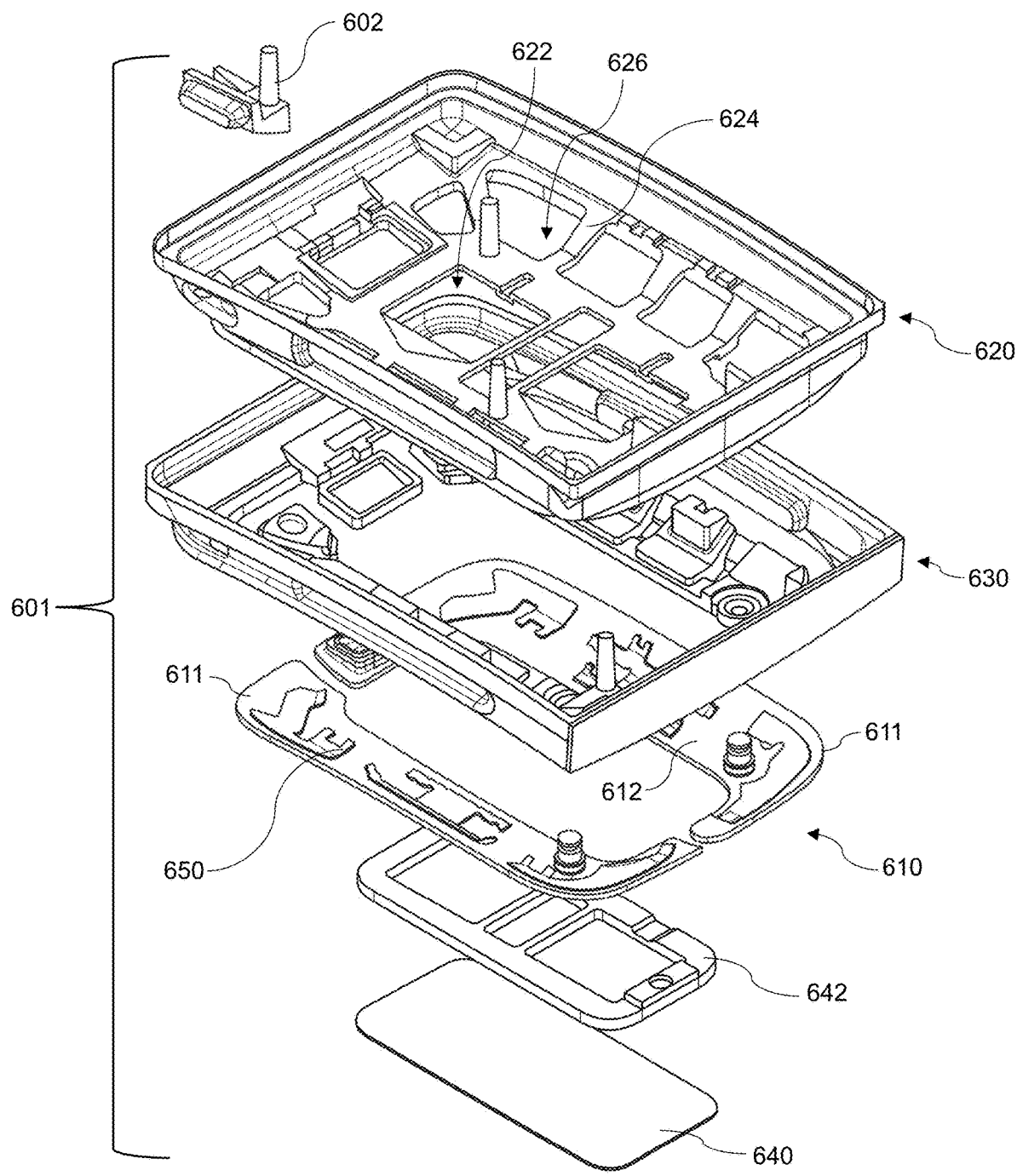
FIG. 6 shows an exploded view of a portion of a housing of a physiological monitoring device.
Figure 7:
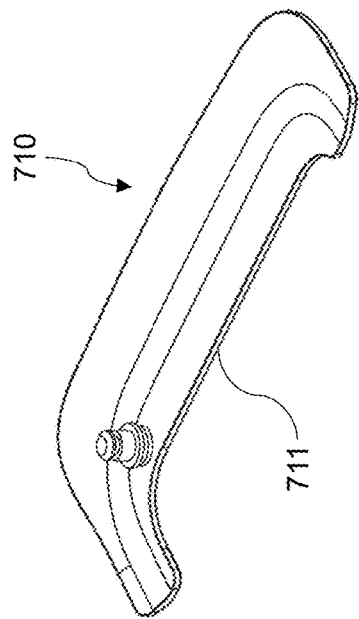
FIG. 7 shows a first part of a physiological monitoring device.
Figure 8:
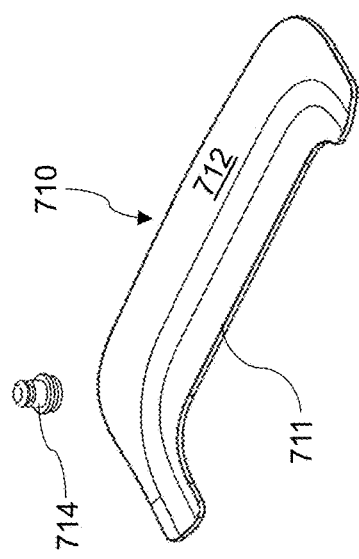
FIG. 8 shows a first part of a physiological monitoring device.

FIG. 6 shows an exploded view of a portion of a housing of a physiological monitoring device. More specifically, FIG. 6 shows an example of a lower portion of a housing 601 of a physiological monitoring device, such as any as described herein. As illustrated, this portion of the housing 601 may form a portion of a waterproof enclosure for the physiological monitoring device. Starting from the top of this figure, the housing 601 may include a light pipe 602 or other component, a second part 620, a third part 630, a first part 610, fourth material 642, and a sheet 640.

The light pipe 602 may be a separate component that is inserted within a structure, mold, or tool, and the second part 620 may be formed around the light pipe 602, e.g., during an injection molding process or similar in order to secure the light pipe 602 to the completed assembly. Alternatively, the light pipe 602 may be inserted into the second part 620 after formation thereof, or the light pipe 602 may be integrated into the design of the second part 620. The light pipe 602 may be used to transmit light from a light source to the skin of a wearer of the physiological monitoring device, and/or to collect light that is transmitted or reflected from the skin for analysis. More generally, the light pipe 602 may provide an optical conduit to support optical coupling between internal components of the housing 601 and an exterior of the housing 601, e.g., for optical sensing, communications, and so forth. It will be understood that the light pipe 602 is provided by way of example only, e.g., to demonstrate how another supplemental component may be included within a device. Other parts using other materials, and/or supporting different functions, may also or instead be assembled with the second part 620 prior to additional assembly steps.

The second part 620 may include a first support structure 624 formed substantially of a second material that is different than a first material used to form the first part 610. For example, the second material may have a second melt temperature that is lower than the first melt temperature of the first material. The first support structure 624 may include one or more openings 626, where at least one of these openings 626 is sized and shaped to receive at least a portion of the first part 610 therein. The first support structure 624 may further define a window 622 between the interior of the enclosure and an exterior of the enclosure, e.g., where the sheet 640 defines a lens providing an optically clear barrier for the window 622. The first support structure 624 may form at least a portion of an exterior surface of the enclosure for the physiological monitoring device. As mentioned above, the second part 620 may be formed via an injection molding process.

The first part 610 may include at least one pad 611 (where FIG. 6 shows two pads 611 by way of example) formed of the first material having the first melt temperature (higher than the melt temperature of the second material of the second part 620). The first part 610 may include a first surface 612 that is configured to be disposed within the interior of the enclosure for the physiological monitoring device, and a second surface (not shown in this figure) that is configured to be disposed along the exterior of the enclosure for the physiological monitoring device (e.g., providing a contact pad for acquiring ECG data from skin of the wearer). In general, the first part 610, or more specifically the pads 611 of the first part 610, may be sized and shaped to cooperate with one or more of the openings 626 of the first support structure 624 for assembly and use. For example, the first support structure 624 may include a rim, flange, or the like structurally configured to laterally retain the pad 611 relative to the first support structure 624, e.g., to prevent lateral displacement during mechanical deformation or stress to the housing.

In one aspect, the first part 610 may include an anchor 650, where at least a part of the anchor 650 can pass through the opening 626 when the pad 611 is placed within the rim on the first support structure 624. These anchors 650 may assist in securing the first part 610 relative to the second part 620 by injecting or otherwise thermoforming a third material to substantially cover the first surface 612 and fill voids in the first support structure 624 when the first part 610 is aligned along an opening 626 of the first support structure 624—e.g., where the injection molding of the third material forms the third part 630 shown in the figure. In this configuration, the anchors 650 can mechanically limit displacement of the pads 611 by securing the first part 610 in three dimensions relative to the third part 630 in which the one or more anchors 650 are embedded. That is, the anchors 650 may serve as interlocking structures to resist movement in three dimensions, increasing the durability of the multi-component housing 601 and limiting the likelihood of separation between the first part 610, the second part 620, and the third part 630 over the lifetime of the physiological monitoring device. In general, the size, shape, and position of the anchors 650 may be optimized for the geometry of the pads 611 to substantially lock each pad 611 in place, resulting in a smooth seamless transition between the first part 610 and the second part 620, which again may be formed of different materials such as a metal and a plastic.

The sheet 640 may be sized and shaped to cooperate with the window 622 of the first support structure 624, e.g., to define a lens along the window 622. The sheet 640 may be formed of an optically clear polymer or the like. The sheet 640 may be secured to the housing 601 by the fourth material 642, which may be injection molded onto or into the housing 601 to bond to both the sheet 640 and the housing 601 to create this securement.

Thus, an example manufacturing technique using the present teachings to form at least a portion of a waterproof enclosure for a wearable physiological monitoring device—particularly an example technique using the anchors 650 of the present teachings to assist in waterproofing securement—may include: forming the first part 610 from at least a first material (e.g., metal) and placing one or more anchors 650 thereon, and inserting the light pipe 602 (and/or other components) into tooling for an injection mold. This latter step may be performed either before or after the second part 620 is formed, and in some aspects, the light pipe 602 may be made from a material that can chemically bond to the second part 620, alleviating a need for mechanical interlocking. The manufacturing technique may further include injection molding the second part 620 using a second material (e.g., plastic) to form the first support structure 624, and then inserting one or more pads 611 of the first part 610 within openings 626 of the first support structure 624. The pads 611 may be supported by the first support structure 624 (e.g., using a rim that forms a perimeter of the opening 626), and/or one or more other support or contact surfaces on the first support structure 624), and the anchor(s) 650 may extend through the openings 626 to an interior portion of the second part 620.

The manufacturing technique may further include injection molding the third part 630 using a third material (e.g., a plastic, which may be the same as the second material) to enclose at least a portion of each anchor 650, and to fill gaps/cavities/other portions of the first support structure 624. By enclosing the anchor(s) 650 in this manner, the third part 630 may mechanically maintain a fixed relationship between the first part 610 (i.e., that has anchors 650 enclosed by the third material), the second part 620, and the third part 630, with the third part 630 chemically bonded to the second part 620 by the injection molding process, thus connecting and interlocking the three parts 610, 620, 630 into a mechanically interlocked, weather-proof, multi-part structure. In this arraignment, the pads 611 on the bottom of the housing 601 may be exposed on an exterior surface of the housing 601, while also being mechanically secured (by the anchor(s) 650) to the housing 601 during the injection molding process, and forming a waterproof or hermetic barrier between exterior and interior surfaces of the housing 601. This example manufacturing technique may further include inserting the sheet 640 onto the window 622, and injection molding the fourth material 642 (e.g., a plastic, which may be the same as or similar to the second material and/or the third material) to secure the sheet 640 to the housing 601. Thus, an example technique may include two or more separate injection molding steps that are progressively performed to create a weatherproof barrier while interlocking non-injection molded components into the multi-part (and multi-material) assembly.

In some implementations, the first support structure 624 of the second part 620 has an interior geometry that is, at least in part, the final geometry of the interior surface in the finished assembly. Cavities formed within the first support structure 624 may be filled by the third material during injection molding or other additive fabrication process(es) that chemically bond the third material of the third part 630 to the second part 620 as the third part 630 is formed. The third material may also flow around the pads 611 of the first part 610, thereby enveloping the anchors 650 and geometrically interlocking the first part 610 and the third part 630. Injection molding processes may use a core—a mold component or tool that gives injected plastic its final shape. In one aspect, a single core may be used to manufacture the assembly of these distinct parts, where the core includes a mold that is used to form the second part 620, and the first part 610 can be added to the second part 620. The third part 630 may then be formed without additional cores, e.g., by rotating or otherwise moving the core to facilitate an addition of the third material to form the third part 630. This single core may then be displaced (e.g., rotated or translated) again to add the fourth material 642 that forms, e.g., window structures and the like for sensing components of the device. In this manner, a single core may be used that moves about a turn table, conveyer, or the like throughout a three-shot injection molding process without ejecting or detaching the assembly for use with a different tool.

According to the foregoing, in one aspect, a manufacturing technique to form a substantially waterproof assembly may include: using a caddy or other similar tool with a mold to receive an injection of material (i.e., the second material, which may be a plastic material) to form the first support structure 624 of the second part 620. Before receiving the injection of material to form the first support structure 624 of the second part 620, one or more one or more additional components (such as the light pipe 602) may be inserted into the caddy or other similar tool having the mold. Where the additional component(s) are made of suitable materials, this technique may advantageously be used to chemically bond the additional component(s) to a structural framework for the device. For example, where the light pipe 602 and the second part 620 each include a plastic material, the heat from the molten plastic material can promote chemical bonding with the light pipe 602 when the second material of the second part 620 is injected into the mold. The technique may further include moving the core, e.g., by rotating and/or translating the caddy, to a location where the first part 610 (with one or more pads 611 and anchors made of metal or the like) can be placed on or within one or more openings 626 of the first support structure 624 of the second part 620. The technique may then include moving the core by rotating and/or translating the caddy to another location, and then receiving a second injection of material (i.e., the third material, which may be a plastic material that is the same as or similar to the second material) to form the second support structure of the third part 630. Next, the caddy and core may be moved, e.g., by rotating and/or translating to a further location to receive a third injection of material (i.e., the fourth material 642, which may be a plastic material that is the same as or similar to one or more of the second material and the third material). The technique may then include moving the caddy and core, e.g., by rotation and/or translation, to another location, and placing a sheet 640 or the like on the assembly as a cover for the sensor window(s) provided by the fourth material. In one aspect, the sheet 640 may be placed onto the second part 620 and/or the third part 630, with the fourth material 642 formed around the sheet 640 to retain the sheet 640 in position. In another aspect, the sheet 640 may be thermoformed, adhered, or otherwise attached to the fourth material 642.

FIGS. 7-11 show a first part of a physiological monitoring device. The first part 710 may be the same as or similar to any described elsewhere herein. In general, the first part 710 may include one or more pads 711, and one or more plates 760 that include one or more anchors 750 formed thereon. The first part 710 (and/or any individual components thereof) may be formed from a first material such as metal (e.g., stainless steel). While metal materials may advantageously provide a conductive exterior surface for sensing, control input, and so forth, other conductive materials may also or instead be used. In other embodiments, non-conductive materials such as glass, ceramics, and the like may also or instead be used, and may advantageously be assembled into waterproof multipart assemblies without the need for adhesives or chemical bonding between the first part 710 and the surrounding plastic housing.

The pads 711 may be formed via a stamping process or the like, which can be used to elastically form metal into a suitable shape. Other techniques such as casting, machining, and the like, may also or instead be used, depending on the types of materials, the degree of precision required, the surface finishes desired, and so forth. The pads 711 may include a first surface 712 that is intended to be disposed within an interior of an enclosure for a wearable physiological monitoring device. The pads 711 may include a second surface that opposes the first surface 712, and that is intended to be exposed along an exterior surface of an enclosure for a wearable physiological monitoring device. These pads 711 may, for example, provide electrodes for obtaining ECG data, or other sensing surfaces or the like to support functional input/output interfaces for the device. In addition to the plates 760, other components may be secured to the pads 711. For example, one or more posts 714 may be secured to the pads 711, e.g., to provide a conductive path for transmitting electrical signals from the exterior of the housing to internal hardware of the wearable physiological monitoring device. These posts 714 (or other features) may also or instead support mechanical alignment of the first part 710 to other parts, provide mechanical attachment points, or otherwise support manufacturing and/or use of the device.

Figure 9:
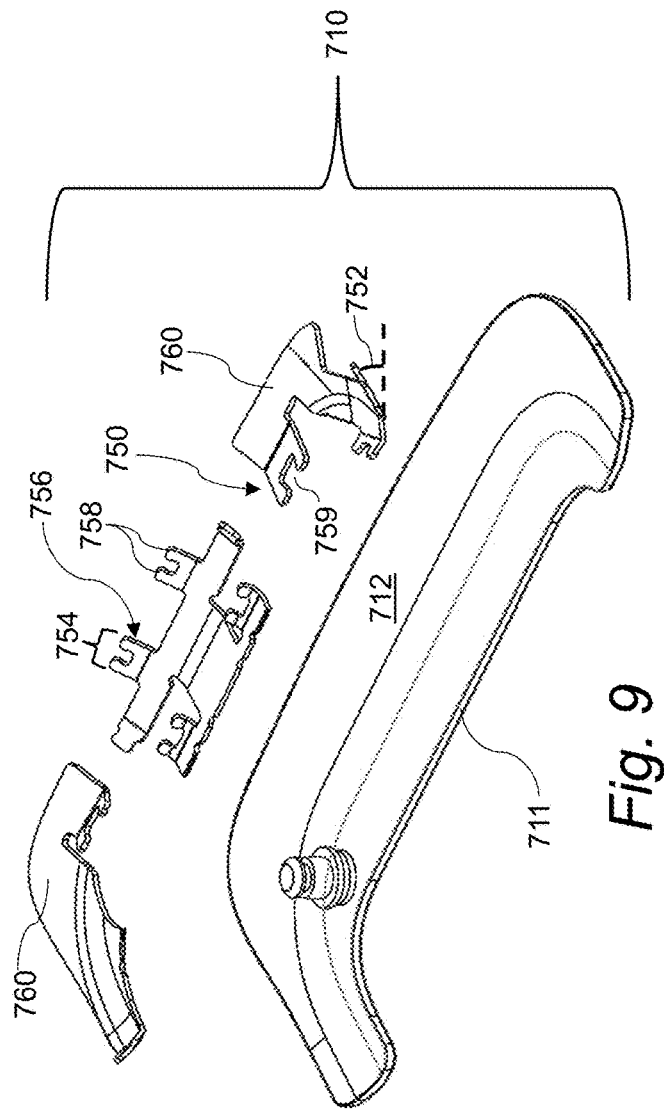
FIG. 9 shows an exploded view of a first part of a physiological monitoring device.
Figure 10:
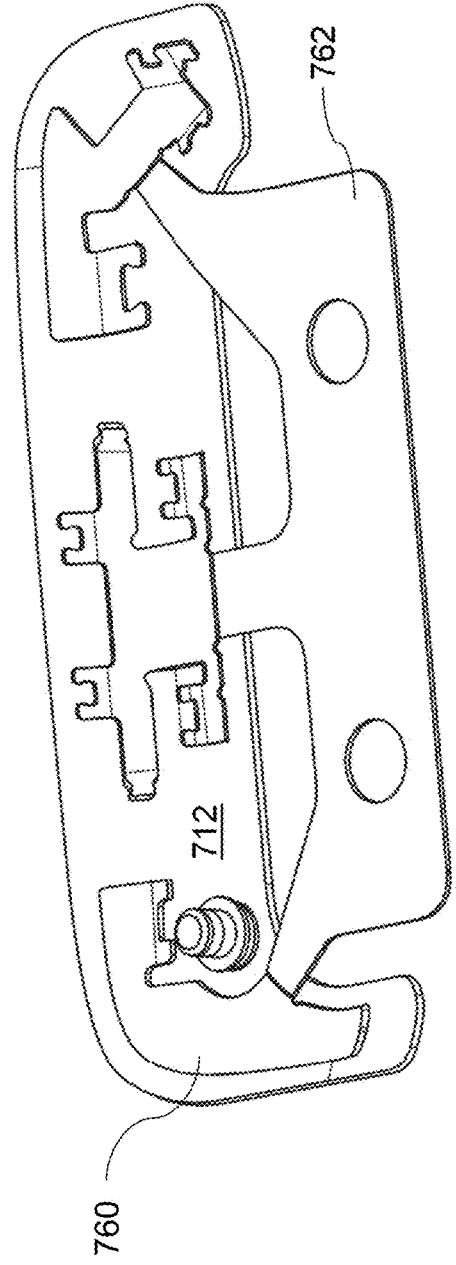
FIG. 10 shows a first part of a physiological monitoring device.
Figure 11:
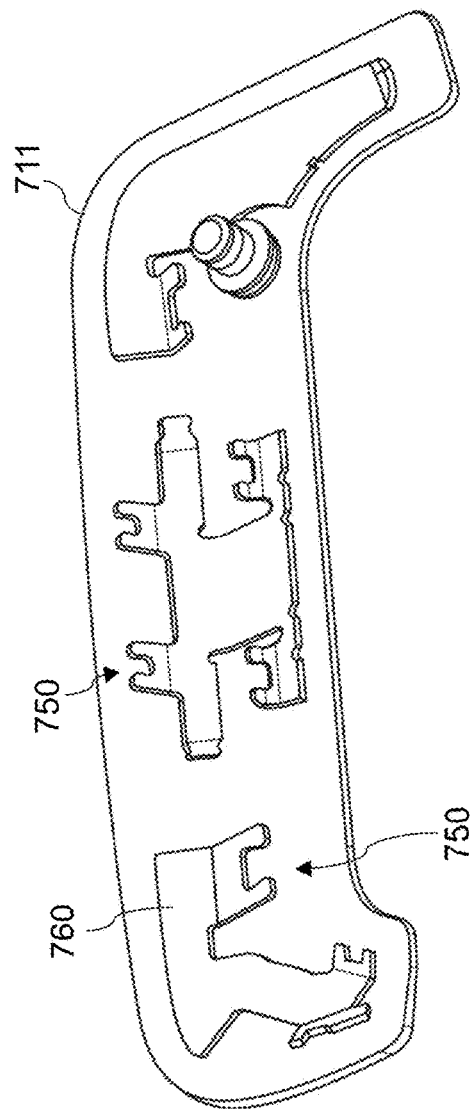
FIG. 11 shows a first part of a physiological monitoring device.

The first part 710 may include a plurality of plates 760, each affixed to a first surface 712 of one of a plurality of pads 711. FIGS. 9-11 show a pad 711 and three plates 760 by way of example, where the plates 760 are shown exploded from the pad 711, although in use these plates 760 would be welded, laser welded, epoxied, or otherwise affixed to the first surface 712, or additively or subtractively manufactured into the first surface 712. FIG. 10 illustrates the plates 760 positioned on and secured to the first surface 712. These plates 760 may be fabricated with a common carrier 762 interconnecting the plates 760 and forming a sacrificial alignment guide that can be removed after the plates 760 are affixed to the first surface 712. The plates 760 may be formed via a stamping process, or any other suitable fabrication process for fashioning materials such as metals into desired shapes.

Each of the plurality of plates 760 may include one or more anchors 750. For example, each of the plurality of plates 760 may include at least two anchors 750 (generally referred to as an anchor structure or anchoring structure), or three or more anchors 750 (as illustrated) generally forming an anchor structure to facilitate mechanical coupling with a thermoformed part. An anchor 750 may be formed along a perimeter of one of the plurality of plates 760 and may project from the perimeter at a first angle 752 such that the anchor 750 is disposed above the first surface 712 of its respective pad 711. Stated otherwise, the first part 710 may include an anchor 750 with an anchor feature 754 having an anchor surface 756 extending horizontally as the anchor feature 754 extends vertically from the first surface 712 of the pad 711. More generally, the anchor surface 756 may extend laterally in one or more directions to resist movement, particularly separation, of the anchor(s) 750 from a surrounding material that has been, e.g., injection molded, or otherwise molded or thermoformed around the anchor(s) 750. In one aspect, one or more of the anchors 750 may include an anchor feature 754 with at least two vertices 758 and a notch formed 759 therebetween. These notches and other mechanical features may be deployed in a variety of geometric configurations useful for manufacturing the multi-part assembly. For example, these features may (a) provide alignment guides for positioning the first part 710 relative to one or more other parts during assembly, (b) provide electrical contacts for coupling to internal electronics within a housing formed by the multi-part assembly, (c) improve the geometric interlock between the first part 710 and other parts thermoformed around the first part 710. In this latter respect, the geometric interlock may be enhanced, e.g., by generally increasing the surface area of engagement between abutting parts, and/or providing multiple surface angles for the anchor(s) 750 that resist displacement from surrounding materials after being embedded by injection molding or the like, even in the absence of a chemical bond therebetween.

Figure 13:
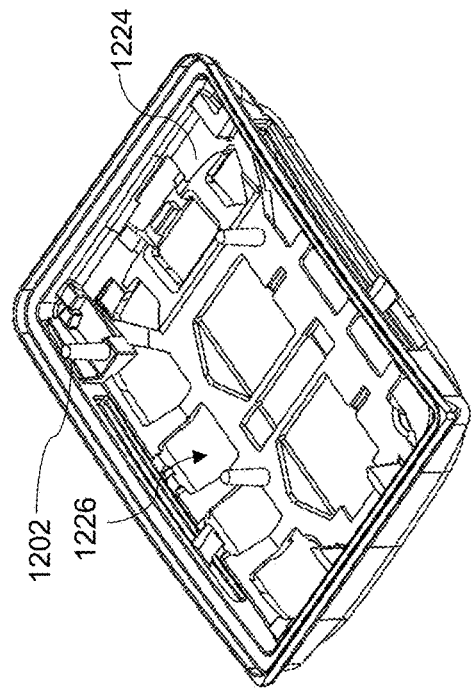
FIG. 13 shows a first view of a second part of a physiological monitoring device.
Figure 12:
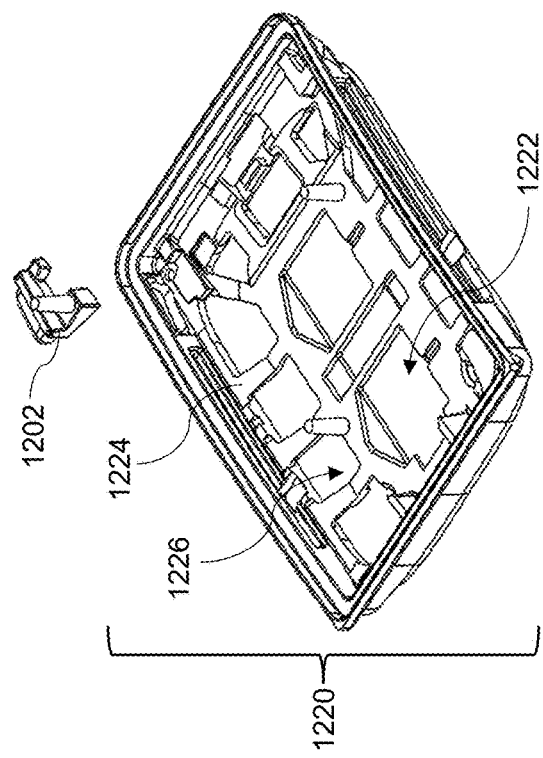
FIG. 12 shows a second part of a physiological monitoring device.
Figure 14:
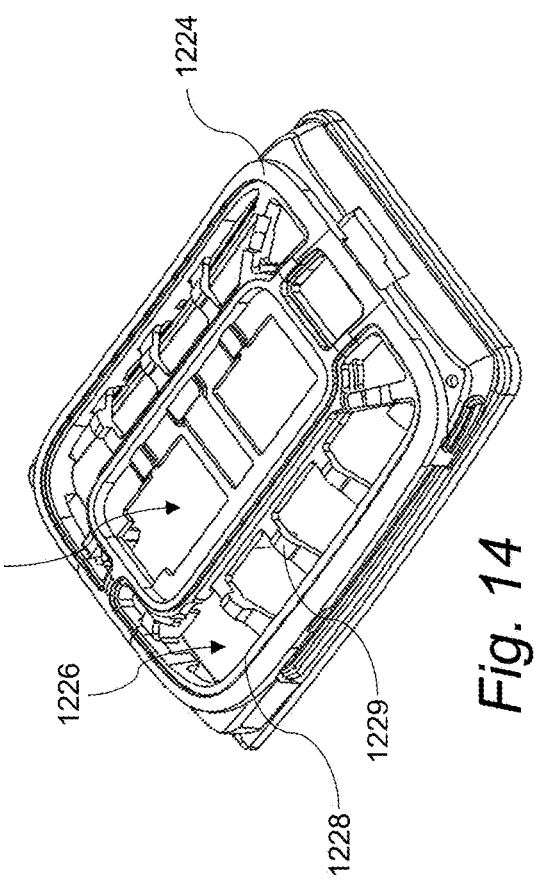
FIG. 14 shows a second view of a second part of a physiological monitoring device.

FIGS. 12-14 show a second part of a physiological monitoring device. Specifically, these figures show different views of the second part 1220, which may be the same as or similar to the parts of a housing as described elsewhere herein. Also, FIGS. 12 and 13 illustrate a light pipe 1202 cooperating with the second part 1220. For example, after the second part 1220 is fabricated, e.g., with injection molding or the like, the light pipe 1202 may be manually or automatically positioned in a suitable location on the second part 1220, and attached with an adhesive, an ultrasonic weld, a screw, a snap fit, or the like. Alternatively, the light pipe 1202 may be made from a similar material as the second part 1220, and may thus be inserted within the core, mold, or other tooling that is used to form the second part 1220, and then chemically bonded to the second part 1220 when the second part 1220 is injection molded.

The second part 1220 may include one or more windows 1222, e.g., for accommodating a lens on an exterior surface of the housing. The second part 1220 may also or instead include one or more openings 1226, e.g., for receiving additional components, such as electrodes or the like, which may be made of a different material (such as metal) and mechanically interlocked to a third part that is chemically bonded to the second part 1220 during injection molding or the like as described herein. The second part 1220 may also form a first support structure 1224 for other components, such as electrodes (e.g., ECG pads) or the like. In one aspect, the second part 1220 may include a rim 1228 around a recessed flange, perimeter shelf, or the like. The rim 1228 may be structurally configured to laterally and vertically retain another component of suitable size and shape (e.g., the first part) when placed on the perimeter shelf and bordered by the rim 1228. The second part 1220 may further include any number of supports 1229 that can also assist in maintaining the position of one or more other components (e.g., the first part) before, during, and/or after assembly.

Figure 16:
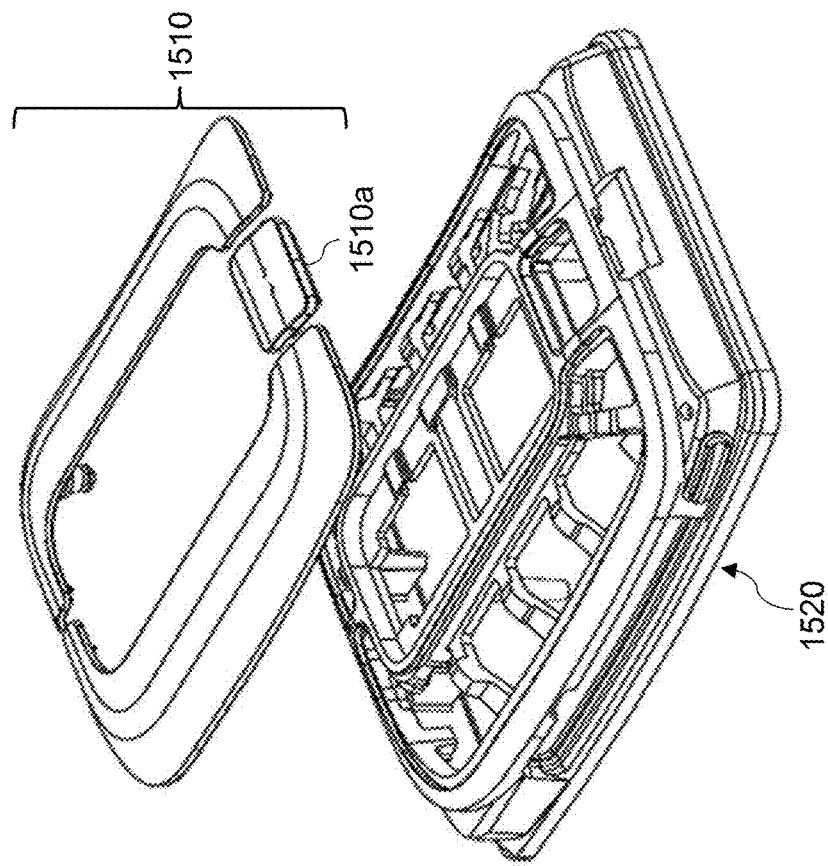
FIG. 16 shows a second view of a first part aligned for coupling with a second part of a physiological monitoring device.
Figure 15:
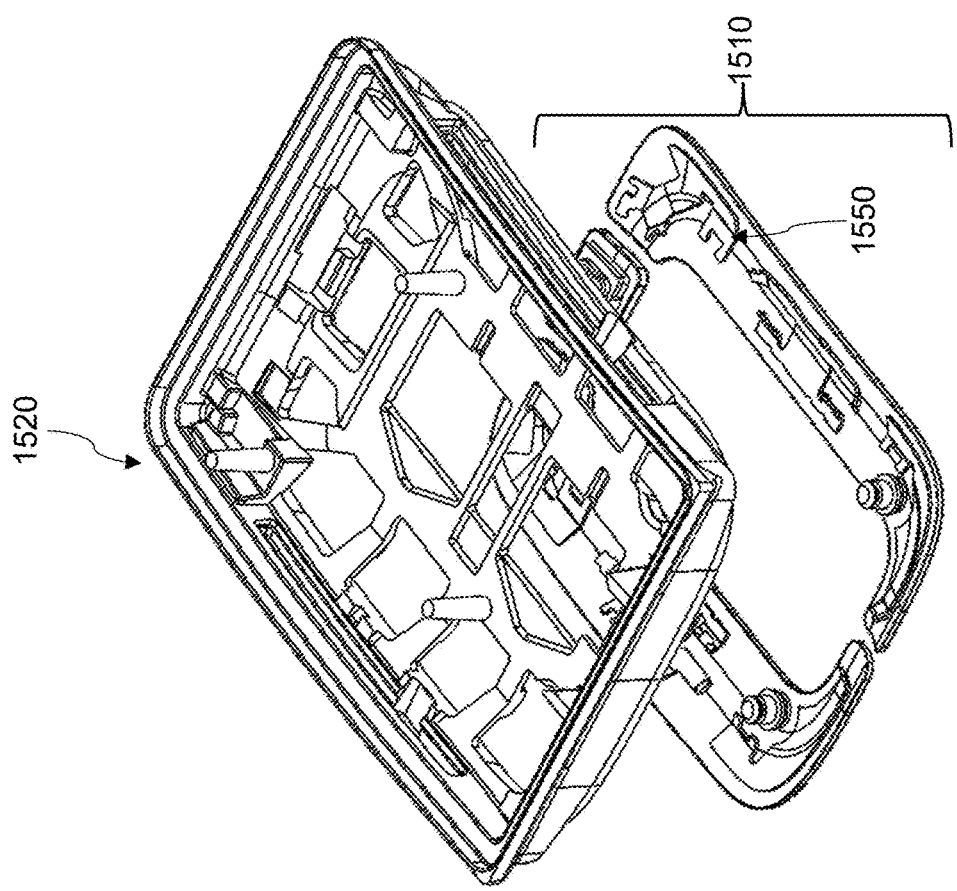
FIG. 15 shows a first view of a first part aligned for coupling with a second part of a physiological monitoring device.

FIGS. 15-16 show a first part aligned for coupling with a second part of a physiological monitoring device. Specifically, FIG. 15 shows a top view of the first part 1510 and the second part 1520, and FIG. 16 shows a bottom view of the first part 1510 and the second part 1520. The first part 1510 and the second part 1520 may be the same as or similar to any of those described herein. An additional first component 1510a, which may be formed of the same material as the first part 1510, may also be incorporated into the device, e.g., to increase the available contact surface of the first part 1510, or to provide an independent contact surface for various sensing applications and the like. The resulting assembly may incorporate multiple components made of dissimilar materials, while the one or more anchors 1550 structurally stabilize the multi-component assembly while permitting an environmental seal around the junctions of these dissimilar components resulting in a final, waterproof device housing.

Figure 17:
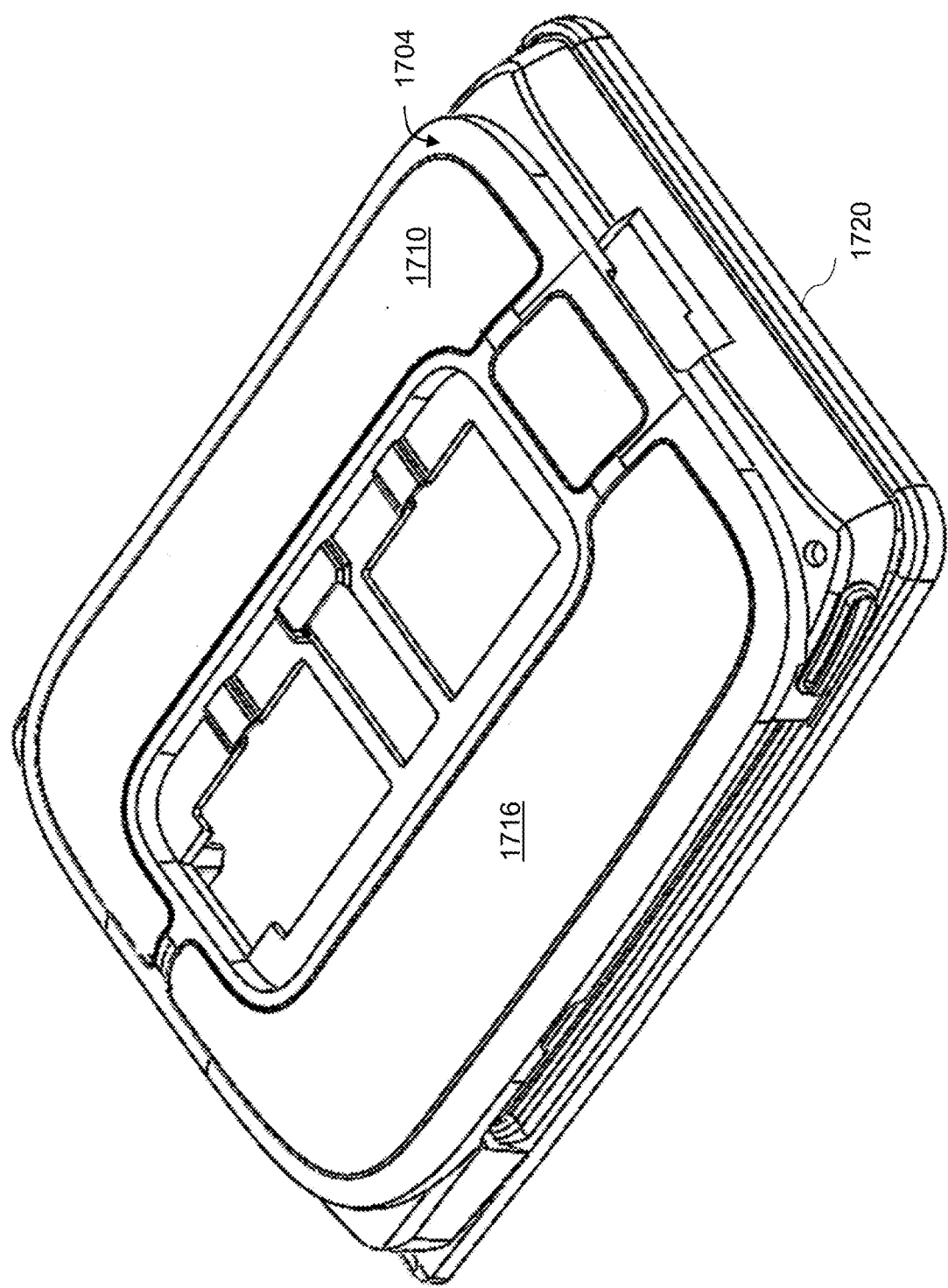
FIG. 17 shows a bottom view of a portion of a housing of a physiological monitoring device with a first part inserted within a second part.

FIG. 17 shows a bottom view of a portion of a housing of a physiological monitoring device with a first part inserted within a second part. The first part 1710 (which may be the same as or similar to any of the parts described herein) may fit within openings of the second part 1520, e.g., where it is supported by a rim, flange, and/or supports as explained above. The first support structure of the second part 1720 may include one or more openings for the first part 1710 (e.g., each of a plurality of pads of the first part 1710) such that a second surface 1716 of each pad—that opposes a first surface containing one or more anchors—is exposed along the exterior surface 1704 of the device while the first surface of each pad is contained within an interior of the device. Stated otherwise, one or more of the first part 1710 and the second part 1720 may form at least a portion of an exterior surface 1704 of a physiological monitoring device, and in some aspects, these parts may be relatively flush along this surface. This may provide comfort for a wearer of the physiological monitoring device, improve waterproofing, and/or facilitate desired sensing operations.

Figure 18:
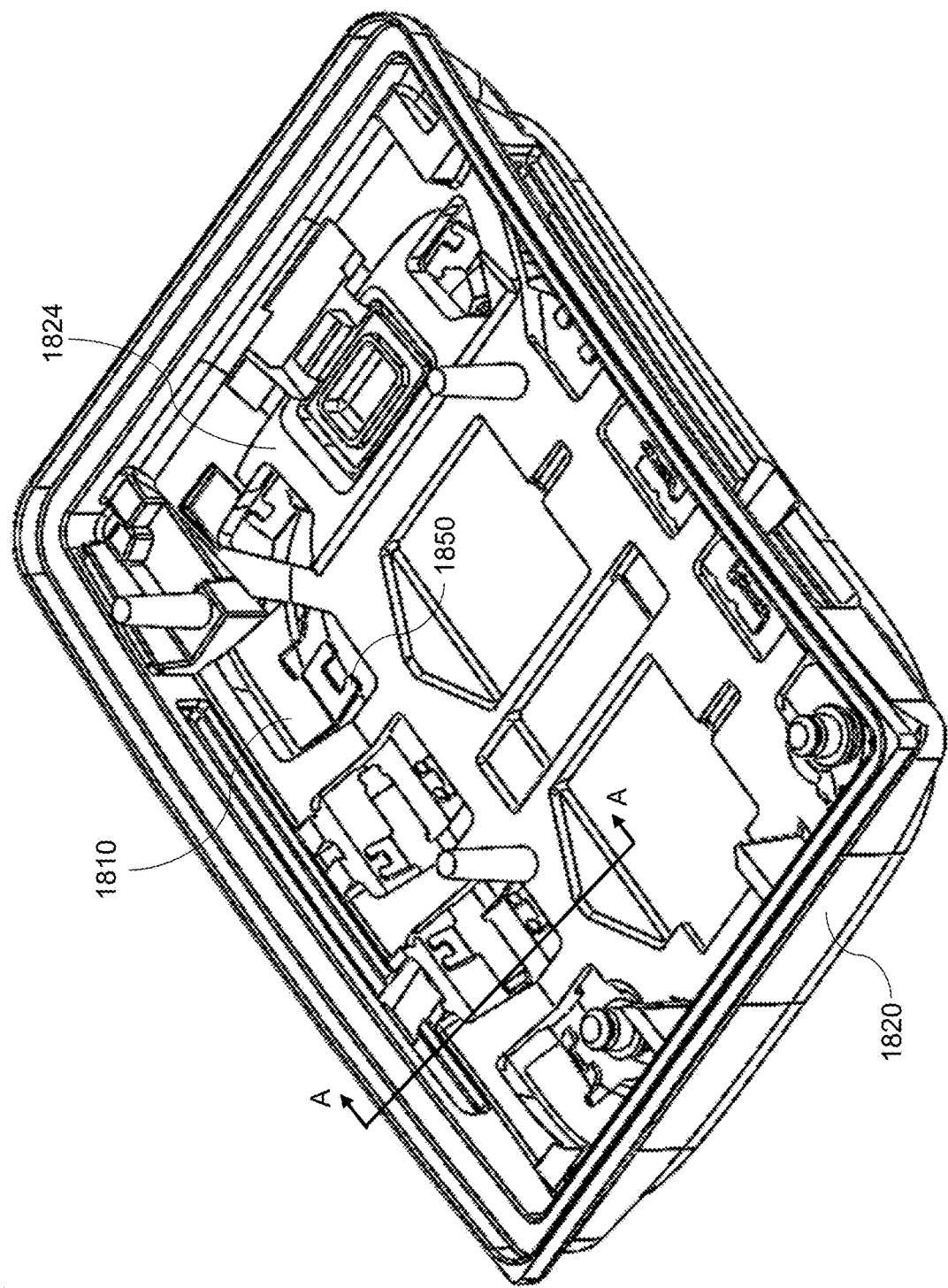
FIG. 18 shows a top view of a portion of a housing of a physiological monitoring device with a first part inserted within a second part.

FIG. 18 shows a top view of a portion of a housing of a physiological monitoring device with a first part inserted within a second part. That is, this figure shows an example view of the interior of a housing for a physiological monitoring device, where the first part 1810 is placed for securement along the second part 1820 (e.g., within one or more openings of the second part 1820), and where anchors 1850 disposed on a first surface of the first part 1810 are visible within a first support structure 1824 of the second part 1820. The anchors 1850 may be disposed in a position where material can be added to form a third part that chemically bonds to the second part 1820 and encloses at least a portion of each anchor 1850 for securement and stability. To this end, the first support structure 1824 of the second part 1820 may include an opening configured to receive the first part 1810 (e.g., an electrode, such as an ECG pad or the like) such that a second surface of the first part 1810 that opposes the first surface of the first part 1810 is exposed along the exterior surface of the device and the first surface of the first part 1810 is contained within an interior of the device. As explained herein, the anchor 1850 may include an anchor feature having an anchor surface extending horizontally as the anchor feature extends vertically from the first surface of the first part 1810, or otherwise extending from the first part 1810 in a manner that can form a mechanical interlock with another material molded over the anchor surface of the anchor 1850 after the first part 1810 and the second part 1820 are assembled. The first part 1810 may be positioned adjacent to the second part 1820 with the anchor 1850 passing through an opening of the second part 1820. In this manner, when material is added to form a third part as described herein, the third part may secure the first part 1810 relative to the second part 1820 by filling a volume between the anchor surface of the anchor 1850 on the first part 1810 and an adjacent surface of the second part 1820 around the opening, while also chemically bonding to the second part 1820 to form a continuous, waterproof barrier for the multi-part assembly.

Figure 19:
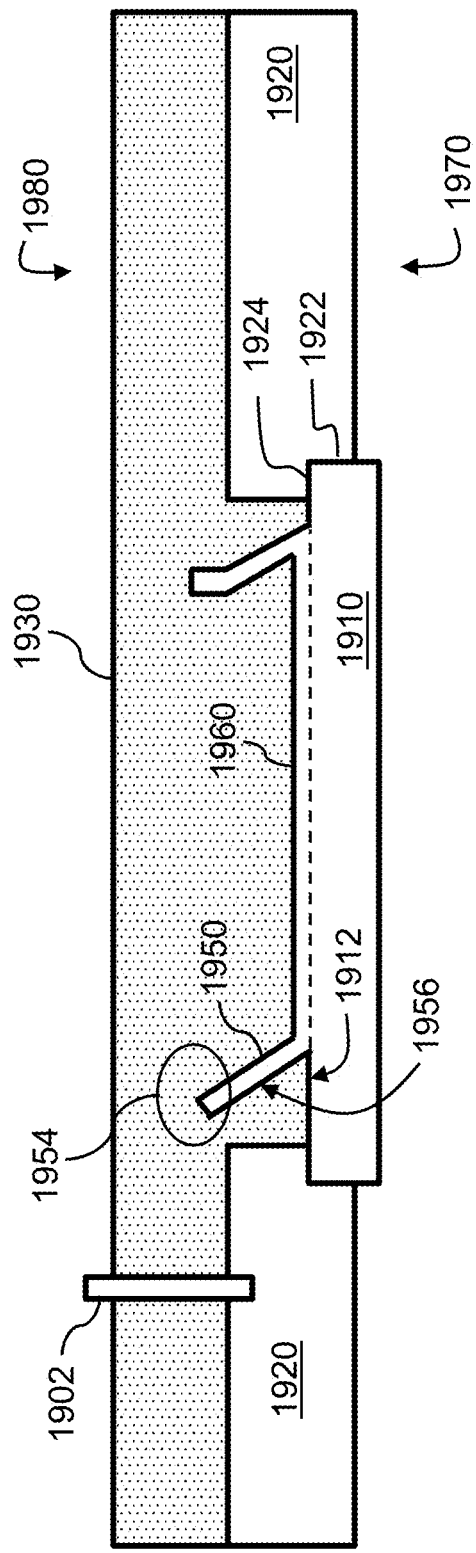
FIG. 19 illustrates a cross section of a device.

FIG. 19 illustrates a cross section of a device. While the perspective is generally according to Section A-A from FIG. 18, it will be understood that the representation in FIG. 19 has been modified and simplified for ease of explanation. Specifically, FIG. 19 shows a representation of a first part 1910 with a plate 1960 adhered thereto and anchors 1950 projecting therefrom, a second part 1920 (with an opening having a rim 1922 and flange 1924 to support the first part 1910), a third part 1930, and a supplemental component 1902 such as a light pipe as described herein. The first part 1910 may fit within an opening of the second part 1920 where it is laterally retained by the rim 1922 and vertically supported by the flange 1924. The first part 1910 may be retained by these features in a position adjacent to the second part 1920 with the anchor 1950 (and its anchor feature 1954) passing through the opening of the second part 1920.

As shown in the figure, the first part 1910 may include one or more anchors 1950, where at least one of the anchors 1950 includes an anchor feature 1954 having an anchor surface 1956 extending horizontally as the anchor feature 1954 extends vertically from a first surface 1912 of the first part 1910. In some aspects, the plate 1960 may include at least one anchor 1950 formed on the plate 1960 and projecting from the plate at an angle such that the anchor 1950 is disposed above the first surface 1912 of the first part 1910. While an anchor feature that vertically extends in this manner may usefully retain the anchor(s) 1950 in a material such as a third part 1930 formed thereabout, the anchor feature(s) may also or instead include any geometric structures that resist movement of the first part 1910 relative to the third part 1930 once the third part 1930 has been formed around the anchor(s) 1950. This may include disposing anchors 1950 and anchor features 1954 with planar surfaces in different angular and rotational orientations to secure the first part 1910 from displacement in three dimensions within material of a third part 1930 formed thereupon.

As shown in the figure, the third part 1930—which may form a second support structure—encloses at least a portion of each anchor 1950 on the plate 1960. The third part 1930 may also be chemically bonded to the second part 1920. In this manner, the third part 1930 may mechanically maintain a fixed relationship between the first part 1910 (which has anchors 1950 enclosed by the third part 1930) and the second part 1920 that is chemically bonded to the third part 1930. At the same time, the second part 1920 and the third part 1930 may form a continuous waterproof barrier between an exterior surface 1970 and an interior surface 1980 of the housing enclosure. The chemical bond between the second part 1920 and the third part 1930 may be created by injection molding the third part 1930 onto at least a portion of each of the first part 1910 and the second part 1920.

In this configuration, the chemical bond between the second part 1920 and the third part 1930 may create an environmental seal around the opening in the second part 1920 through which the first part 1910 is positioned. Surfaces of the anchors 1950 may be fully enclosed with the material of the third part 1930 which, when chemically bonded to the second part 1920, provides a continuous barrier with no ingress points, which can aid in creating a hermetic seal for an interior of a device. In other words, all areas between the outside of the device and the inside of the device may be separated by a continuous barrier formed by the parts that have been chemically bonded and sealed to each other. Thus, the assembly may incorporate metallic parts or the like, while forming a waterproof enclosure for one or more electronic components housed within the multi-part assembly.

Figure 20:
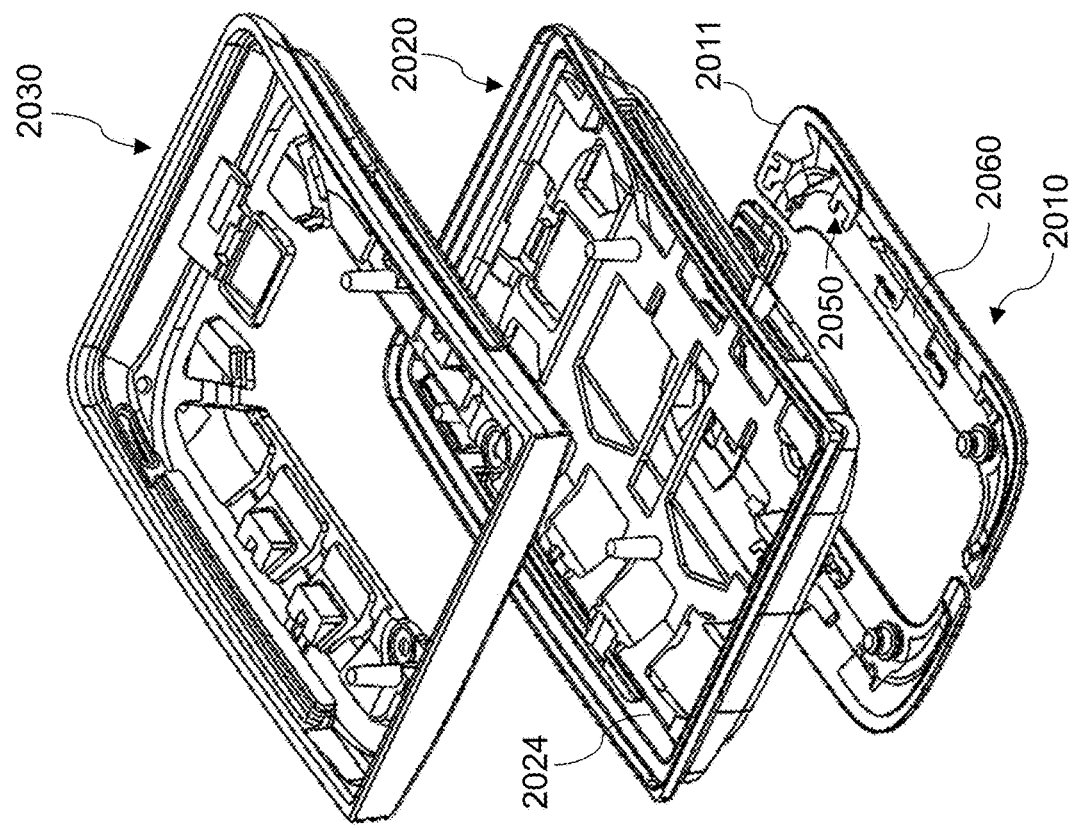
FIG. 20 shows an exploded view of a first part, a second part, and a third part of a multi-part structure.

FIG. 20 shows an exploded view of a first part, a second part, and a third part of a multi-part structure such as a portion of a housing of a physiological monitoring device.

Figure 21:
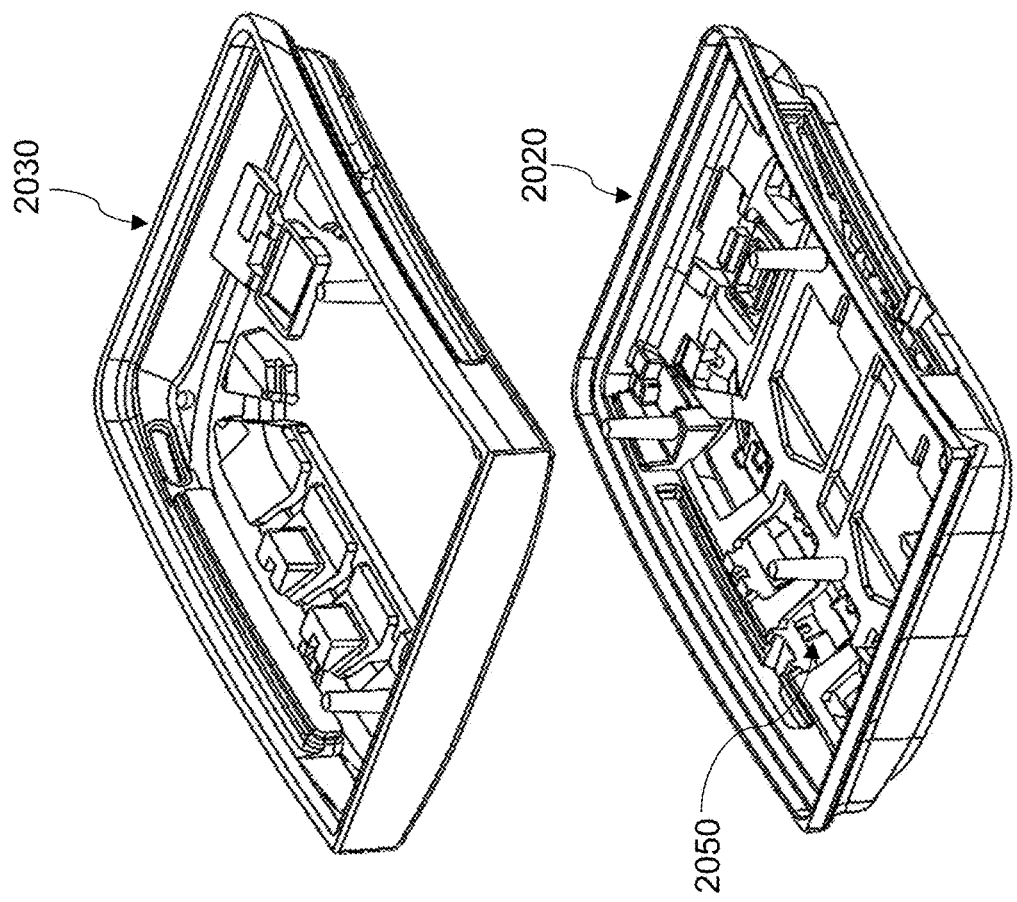
FIG. 21 shows an exploded view of a second part and a third part of a multi-part structure.

FIG. 21 shows an exploded view of a second part and a third part of a portion of a multi-part structure such as a housing of a physiological monitoring device.

Figure 22:
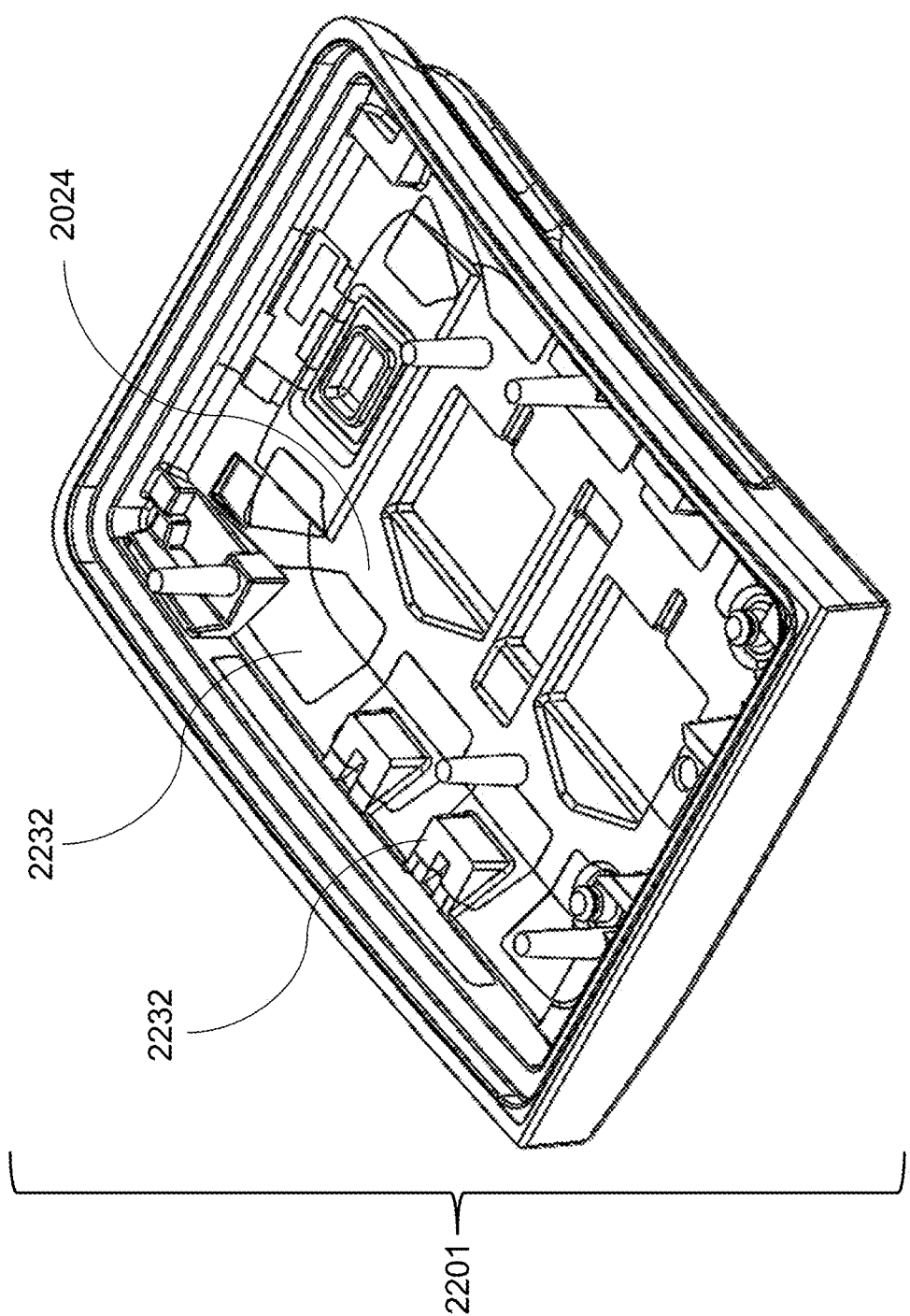
FIG. 22 shows a top view of a portion of a multi-part structure.

FIG. 22 shows a top view of a multi-part structure 2201 that may be used, e.g., as a portion of a housing of a physiological monitoring device. Specifically, these figures show a representation of how the first part 2010, the second part 2020, and the third part 2030 may cooperate with one another.

In an example manufacturing process using the present teachings to form a waterproof enclosure for an electronic device such as a wearable physiological monitor, the first part 2010 may be formed from a first material such as metal, glass, ceramics, or the like. In one aspect, the pads 2011 forming the first part 2010 may be stamped or otherwise formed from a metal material. Plates 2060 containing anchors 2050 may then be adhered to the pads 2011, e.g., using welding, laser welding, epoxy or the like, or otherwise formed in or attached to the plates 2060. In one aspect, one or more anchors 2050 may be integrally formed with a pad 2011, e.g. using stamping, machining, or the like.

The second part 2020 may be formed from a second material that is different than the first material of the first part 2010. For example, the second part 2020 may be formed of a plastic such as acrylonitrile butadiene styrene (ABS), polyethylene (PE), polypropylene (PP), polycarbonate (PC), polyvinyl chloride (PVC), polyethylene terephthalate (PET), polystyrene (PS), polyamide (Nylon), polyether ether ketone (PEEK), and so forth. In certain implementations, regardless of materials used, the second part 2020 may be formed of a material having a substantially lower melting temperature compared to that of the first material of the first part 2010, and/or may be formed of a material that cannot be readily chemically bonded to the first material of the first part 2010. In some aspects, the second part 2020 is formed via injection molding. The second part 2020 may include a first support structure 2024 having one or more features to facilitate alignment with and coupling to the first part 2010. With suitable mechanical keying or the like, the first part 2010 may engage with the second part 2020 in a manner that enforces a desired location and/or rotation before forming a third part 2030.

As shown in FIG. 21, when coupled in a predetermined manner, anchors 2050 of the first part 2010 may project into an interior of the combined structure, where certain parts of the anchors 2050 can be disposed adjacent to and/or above certain parts of the first support structure 2024. The third part 2030 may fixedly secure the first part 2010 relative to the second part 2020 at least in part by surrounding and interlocking with the anchors 2050. That is, in certain aspects, a third material may be added to the assembled first part 2010 and second part 2020, e.g., using an injection molding process, which may be a separate injection subsequent to the injection molding process used to form the second part 2020. The third material of the third part 2030 may be the same material as the second material used to form the second part 2020, or any other material suitable for chemically bonding to the second part 2020 during a molding process. In this manner, the third material may flow over the first part 2010, and over and around at least a portion of the second part 2020 filling various negative spaces around each anchor 2050 to physically secure the third part 2030 to the first part 2010, while also chemically bonding to the second part 2020 to interlock the three components in a fixed structural relationship. Once interconnected in this manner, the third part 2030 can mechanically maintain a fixed relationship between the first part 2010 (i.e., that has anchors 2050 enclosed by the third material) and the second part 2020 that is chemically bonded to the third material, with the pads 2011, such as metallic or other conductive contact surfaces, on the bottom of the combined structure mechanically secured in place along an exterior surface of the multi-part structure. At the same time, as noted herein, the second part 2020 and the third part 2030 may chemically bond to one another to form a single, continuous environmental barrier between opposing sides of the overall multi-part structure 2201.

Thus, in certain aspects, it will be understood that, while the third part 2030 in FIGS. 20 and 21 is illustrated as a separate part, it is formed into void spaces between the first part 2010 and the second part 2020 during a subsequent material flow, e.g., a second injection molding process. The resulting multi-part structure 2201 of the first part 2010, the second part 2020, and the third part 2030 may, for example, form a portion of a housing, e.g., as illustrated in FIG. 22. In one aspect, the chemically bonded second part 2020 and third part 2030 of the multi-part structure collectively form a waterproof and/or dustproof barrier for components within the enclosure. Although not illustrated, it will be understood that an additional one or more components may be coupled to the multi-part structure of FIG. 22 (and/or FIG. 23) to fully seal an interior space of the housing against an exterior environment, thus forming a waterproof and/or dustproof enclosure.

Figure 23:
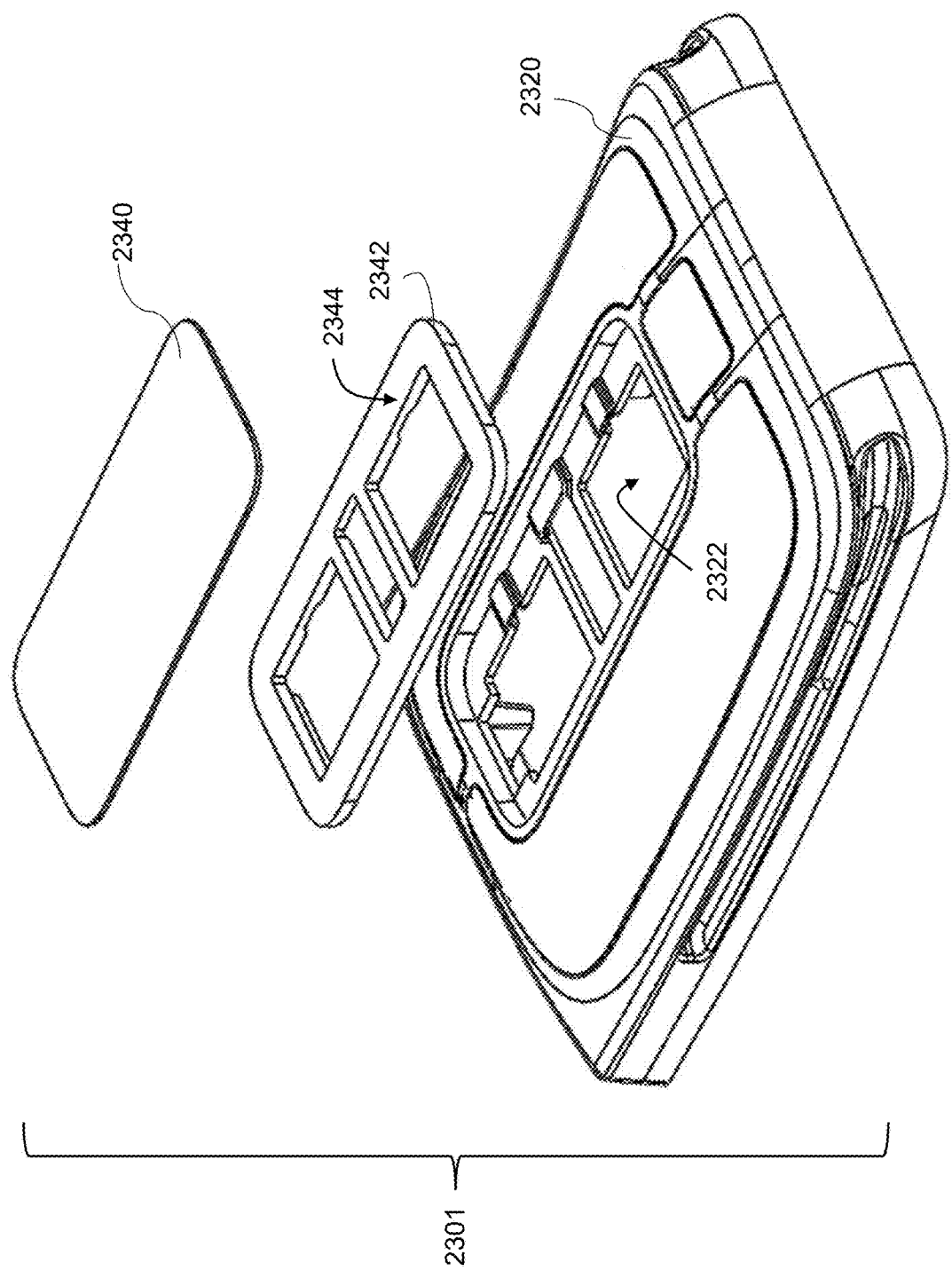
FIG. 23 shows a sheet aligned for coupling with a portion of a multi-part structure.

FIG. 23 shows a sheet aligned for coupling with a portion of a multi-part structure 2301 such as a housing of a physiological monitoring device. As described herein, the portion of the multi-part structure 2301 may, for example, be combined with additional components to form, e.g., a complete housing or enclosure for a wearable monitor such as any of the wearable monitors described herein, which may enclose in a waterproof and dustproof manner the electronics and other components for such a wearable monitor. A portion of the structure 2301 (and more specifically the second part 2320) may define a window 2322 between the interior of the structure 2301 and an exterior of the structure 2301. The window 2322 may be sized and shaped to accommodate a sheet 2340, which may be formed of an optically clear polymer or other suitable material to provide a lens or the like to facilitate optical sensing through the window 2322 while retaining the environmental barrier provided by the rest of the structure 2301.

In an aspect, to secure the sheet 2340 to the structure 2301, a fourth part 2342 may be fashioned of a fourth material. The fourth material may have a melt temperature less than the first melt temperature of the first part 2310—e.g., the fourth material may be a plastic. In some aspects, the fourth material is same as, or similar to, the material of the second part and the third part described herein. Thus, the fourth material may be chemically bonded to the structure 2301—and more specifically, to one or more of the second part and the third part—in an injection molding process or the like to maintain a position of the sheet 2340 along the window 2322. This may include an injection molding step separate and distinct from an injection molding process used to form each of the second part and the third part. Thus, in some aspects, a sheet 2340 may be placed into the recess included in the structure 2301 (which may be formed by the first support structure of the second part as described herein), where this clear, thin sheet of, e.g., polycarbonate or other optically clear polymer, can allow optical coupling through the sheet 2340 covering the window 2322. With the sheet 2340 in a suitable position, e.g., positioned to cover one or more optical sources and/or sensors of a physiological monitor, the fourth material may be added—e.g., in an injection molding process, where the fourth material flows behind the sheet 2340 chemically bonding to the sheet 2340 and the structure of the structure 2301 (e.g., the second part) thereby forming the fourth part 2342 and coupling the sheet 2340 in a fixed relationship to the multi-part structure 2301. In some aspects, e.g., where the sheet 2340 does or might not completely bond to fourth part 2342, a potting process or the like may be used to rigidize and lock the sheet 2340 to the structure 2301.

In an alternate technique to secure the sheet 2340 to the housing 2301, a fourth part 2342 may be formed around the window 2322 with the fourth material, e.g., by being injection molded onto the second part 2320, or otherwise forming the fourth part 2342 around the window 2322 in the second part 2320 and chemically bonding the fourth part 2342 to the structure 2301. The fourth part 2342 may then provide a suitable bonding surface 2344 for the sheet 2340, e.g., a generally large, smooth, planar surface. During assembly, the sheet 2340 may then be placed onto the bonding surface 2344 and adhered using any suitable technique, such as adhesives, epoxies, ultrasonic welding, heating/melting, and so forth. In one aspect, the bonding surface 2344 may be slightly recessed from an exposed surface of the second part in order to provide an alignment rim for placement of the sheet 2340, and to provide a vertical offset so that the sheet 2340 and the exterior of the second part can form a substantially smooth and continuous surface.

The above systems, devices, methods, processes, and the like may be realized in hardware, software, or any combination of these suitable for the control, data acquisition, and data processing described herein. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software.

Thus, in one aspect, each method described above, and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. The code may be stored in a non-transitory fashion in a computer memory, which may be a memory from which the program executes (such as random access memory associated with a processor), or a storage device such as a disk drive, flash memory or any other optical, electromagnetic, magnetic, infrared, or other device or combination of devices. In another aspect, any of the systems and methods described above may be embodied in any suitable transmission or propagation medium carrying computer-executable code and/or any inputs or outputs from same. In another aspect, means for performing the steps associated with the processes described above may include any of the hardware and/or software described above. All such permutations and combinations are intended to fall within the scope of the present disclosure.

The method steps of the implementations described herein are intended to include any suitable method of causing such method steps to be performed, consistent with the patentability of the following claims, unless a different meaning is expressly provided or otherwise clear from the context. So, for example, performing the step of X includes any suitable method for causing another party such as a remote user, a remote processing resource (e.g., a server or cloud computer) or a machine to perform the step of X. Similarly, performing steps X, Y, and Z may include any method of directing or controlling any combination of such other individuals or resources to perform steps X, Y, and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity and need not be located within a particular jurisdiction.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form a part of the invention as defined by the following claims.

What is claimed is:

1. A waterproof wearable physiological monitoring device, the device comprising:
   a first part, the first part including:
      a plurality of pads, each pad of the plurality of pads formed of a first material having a first melt temperature, and
      a plurality of plates, each affixed to a first surface of one of the plurality of pads, each of the plurality of plates including at least one anchor formed along a perimeter of one of the plurality of plates and projecting from the perimeter at a first angle such that the at least one anchor is disposed above the first surface of its respective pad;
   a second part, wherein:
      the second part includes a first support structure formed substantially of a second material having a second melt temperature that is lower than the first melt temperature, and
      the first support structure includes one or more openings for each of the plurality of pads such that a second surface of each pad that opposes the first surface is exposed along an exterior surface of the device and the first surface of each pad is contained within an interior of the device; and
   a third part, wherein:
      the third part includes a second support structure formed substantially of a third material having a third melt temperature that is lower than the first melt temperature,
      the second support structure is chemically bonded to the first support structure of the second part, and
      the second support structure encloses at least a portion of each anchor on the plurality of plates,
      whereby the second support structure mechanically maintains a fixed relationship between the first part that has anchors enclosed by the second support structure and the second part that is chemically bonded to the second support structure.

2. The device of claim 1, wherein the third material is the same as the second material, and wherein the third melt temperature is the same as the second melt temperature.

3. The device of claim 1, wherein the first material has an electrical conductivity of at least $1 \times 10^6$ $\Omega^{-1} \cdot m^{-1}$, and wherein one or more of the second material and the third material have an electrical resistivity of at least $1 \times 10^6$ $\Omega \cdot m$.

4. The device of claim 1, wherein the second melt temperature and the third melt temperature are between 150° C. and 350° C., and wherein the first melt temperature is between 450° C. and 2000° C.

5. The device of claim 1, wherein the first material is a metal.

6. The device of claim 1, wherein each of the second material and the third material is one or more of a polycarbonate and a thermoplastic.

7. The device of claim 1, wherein the position of each pad is maintained without use of any of adhesive, tape, or additional substrates.

8. The device of claim 1, wherein the at least one anchor includes at least two vertices with a notch formed therebetween.

9. The device of claim 1, wherein each of the plurality of plates includes at least two anchors.

10. The device of claim 1, wherein the first support structure forms at least a portion of the exterior surface of the device.

11. The device of claim 1, wherein the first support structure defines a window between the interior of the device and an exterior of the device, the device further comprising:
    a sheet formed of an optically clear polymer, the sheet defining a lens disposed along the window; and
    a fourth material having a melt temperature less than the first melt temperature, the fourth material chemically bonded to one or more of the first support structure and the second support structure.

12. An assembly for a wearable physiological monitor comprising:
    a first part, wherein:
       the first part is formed of a first material having a first melt temperature,
       the first part includes a first surface, and
       the first part includes an anchor with an anchor feature having an anchor surface extending horizontally as the anchor feature extends vertically from the first surface;
    a second part, wherein:
       the second part is formed of a second material having a second melt temperature lower than the first melt temperature,
       the second part includes an opening, and
       the first part is positioned adjacent to the second part with the anchor feature passing through the opening; and
    a third part, wherein:
       the third part is formed of a third material having a third melt temperature lower than the first melt temperature,
       the third part is secured to the second part by a chemical bond, and
       the third part secures the first part relative to the second part by filling a volume between the anchor surface of the first part and an adjacent surface of the second part around the opening,
    wherein the assembly forms a waterproof enclosure for one or more electronic components.

13. The assembly of claim 12, wherein the third part encloses at least a portion of the anchor feature.

14. The assembly of claim 12, wherein the chemical bond between the second part and the third part creates an environmental seal around the opening.

15. The assembly of claim 12, wherein the second part includes a rim structurally configured to laterally retain the first part relative to the second part.

16. The assembly of claim 12, wherein the third material is the same as the second material, and wherein the third melt temperature is the same as the second melt temperature.

17. The assembly of claim 12, wherein the first material is an electrically conductive material, and wherein the second and third materials are electrically resistive materials.

18. The assembly of claim 12, wherein the first material is a metal, and wherein each of the second material and the third material is one or more of a polycarbonate and a thermoplastic.

19. The assembly of claim 12, wherein the anchor includes at least two vertices with a notch formed therebetween.

20. An assembly for a wearable physiological monitor comprising:
- a first part, wherein:
  - the first part is formed of a first material having a first melt temperature,
  - the first part includes a first surface, and
  - the first part includes an anchor with an anchor feature having an anchor surface extending horizontally as the anchor feature extends vertically from the first surface, wherein the anchor includes at least two vertices with a notch formed therebetween;
- a second part, wherein:
  - the second part is formed of a second material having a second melt temperature lower than the first melt temperature,
  - the second part includes an opening, and
  - the first part is positioned adjacent to the second part with the anchor feature passing through the opening; and
- a third part, wherein:
  - the third part is formed of a third material having a third melt temperature lower than the first melt temperature,
  - the third part is secured to the second part by a chemical bond, and
  - the third part secures the first part relative to the second part by filling a volume between the anchor surface of the first part and an adjacent surface of the second part around the opening.

\* \* \* \* \*